US012779753B2

United States Patent
(12) United States Patent
Mizunashi

(10) Patent No.: US 12,779,753 B2
(45) Date of Patent: Nov. 3, 2026

(54) LEARNED MODEL AND MANAGEMENT APPARATUS FOR INJECTION MOLDING MACHINE

(71) Applicant: SUMITOMO HEAVY INDUSTRIES, LTD., Tokyo (JP)

(72) Inventor: Takuya Mizunashi, Chiba (JP)

(73) Assignee: SUMITOMO HEAVY INDUSTRIES, LTD., Tokyo (JP)

(*) Notice: Subject to any disclaimer, the term of this patent is extended or adjusted under 35 U.S.C. 154(b) by 219 days.

(21) Appl. No.: 18/915,625

(22) Filed: Oct. 15, 2024

(65) Prior Publication Data

US 2025/0128459 A1 Apr. 24, 2025

(30) Foreign Application Priority Data

Oct. 20, 2023 (JP) ................................ 2023-181176

(51) Int. Cl.
*B29C 45/76* (2006.01)
*G06N 3/084* (2023.01)

(52) U.S. Cl.
CPC ........... *B29C 45/766* (2013.01); *G06N 3/084* (2013.01); *B29C 2945/76949* (2013.01); *B29C 2945/76979* (2013.01)

(58) Field of Classification Search
CPC .................................................... B29C 45/766
USPC ........................................................ 700/200
See application file for complete search history.

(56) References Cited

U.S. PATENT DOCUMENTS

2018/0281256 A1* 10/2018 Asaoka ................. B29C 45/768
2020/0202235 A1* 6/2020 Chen ....................... G06F 17/18
2020/0230857 A1* 7/2020 Bonada Bo ............. B29C 45/76
2021/0379807 A1 12/2021 Okubo et al.
2022/0388215 A1* 12/2022 Yu ...................... G05B 13/0265
2023/0347564 A1 11/2023 Wollny et al.
(Continued)

FOREIGN PATENT DOCUMENTS

DE 102021119992 12/2022
DE 102024128582 4/2025
(Continued)

OTHER PUBLICATIONS

Zhu, Jun-Yan, et al. "Toward multimodal image-to-image translation" Advances in neural Information processing systems. 2017.

*Primary Examiner* — Travis R Hunnings
(74) *Attorney, Agent, or Firm* — IPUSA, PLLC

(57) ABSTRACT

A learned model includes an input layer; intermediate layers connected to the input layer; and an output layer connected to the intermediate layer. The learned model causes a computer to function to perform machine learning based on first data indicating a result detected while a product is produced by an injection molding machine or a result of measuring the product after the product is produced, and ground truth information indicating whether a value included in a section is ground truth for each section obtained by dividing an amount relating to production of the product into sections, and output, from the output layer, a degree to which the value included in the section is the ground truth, when second data is input from the input layer, the second data indicating the result detected while the product is produced or the result of measuring the product after being produced.

8 Claims, 13 Drawing Sheets

(56) References Cited

U.S. PATENT DOCUMENTS

| | | | | |
|---|---|---|---|---|
| 2024/0042665 | A1* | 2/2024 | Yagi | B29C 45/76 |
| 2024/0092004 | A1* | 3/2024 | Von Beuningen | B29C 45/7693 |
| 2024/0100763 | A1 | 3/2024 | Ohshita et al. | |
| 2024/0411440 | A1* | 12/2024 | Nakazono | B29C 45/766 |
| 2025/0117554 | A1 | 4/2025 | Mizunashi et al. | |

FOREIGN PATENT DOCUMENTS

| | | |
|---|---|---|
| JP | 6737971 | 8/2020 |
| JP | 2021-191619 | 12/2021 |
| JP | 2022-113523 | 8/2022 |
| JP | 2022-175563 | 11/2022 |

* cited by examiner

FIG.5

| NUMBER | MOLD CLAMPING FORCE SETTING VALUE [kN] | MOLD CLAMPING FORCE DETECTION VALUE [kN] | MEASUREMENT VALUE | MOLD CLAMPING FORCE RECOMMENDED VALUE [kN] | MOLD CLAMPING FORCE ADJUSTMENT VALUE [kN] |
|---|---|---|---|---|---|
| 1 | 1000 | 990 | 0 | 380 | −610 |
| 2 | 900 | 914 | 2 | 380 | −534 |
| 3 | 800 | 792 | 3 | 380 | −412 |
| 4 | 700 | 690 | 5 | 380 | −310 |
| 5 | 600 | 609 | 6 | 380 | −229 |
| 6 | 500 | 510 | 8 | 380 | −130 |
| 7 | 400 | 380 | 10 | 380 | 0 |
| 8 | 300 | 310 | 45 | 380 | 70 |
| 9 | 200 | 186 | 80 | 380 | 194 |
| 10 | 100 | 115 | 140 | 380 | 265 |
| 11 | 0 | −3 | 180 | 380 | 383 |
| ⋮ | ⋮ | ⋮ | ⋮ | ⋮ | ⋮ |

FIG.7

| NUMBER | [−1000, −900) | [−900, −800) | [−800, −700) | [−700, −600) | [−600, −500) | [−500, −400) | [−400, −300) | [−300, −200) | [−200, −100) | [−100, 0) | [0, 100) | [100, 200) | [200, 300) | [300, 400) | [400, 500) | [500, 600) | [600, 700) | [700, 800) | [800, 900) | [900, 1000) |
|---|---|---|---|---|---|---|---|---|---|---|---|---|---|---|---|---|---|---|---|---|
| 1 | 0 | 0 | 0 | 1 | 0 | 0 | 0 | 0 | 0 | 0 | 0 | 0 | 0 | 0 | 0 | 0 | 0 | 0 | 0 | 0 |
| 2 | 0 | 0 | 0 | 0 | 1 | 0 | 0 | 0 | 0 | 0 | 0 | 0 | 0 | 0 | 0 | 0 | 0 | 0 | 0 | 0 |
| 3 | 0 | 0 | 0 | 0 | 0 | 1 | 0 | 0 | 0 | 0 | 0 | 0 | 0 | 0 | 0 | 0 | 0 | 0 | 0 | 0 |
| 4 | 0 | 0 | 0 | 0 | 0 | 0 | 1 | 0 | 0 | 0 | 0 | 0 | 0 | 0 | 0 | 0 | 0 | 0 | 0 | 0 |
| 5 | 0 | 0 | 0 | 0 | 0 | 0 | 0 | 1 | 0 | 0 | 0 | 0 | 0 | 0 | 0 | 0 | 0 | 0 | 0 | 0 |
| 6 | 0 | 0 | 0 | 0 | 0 | 0 | 0 | 0 | 1 | 0 | 0 | 0 | 0 | 0 | 0 | 0 | 0 | 0 | 0 | 0 |
| 7 | 0 | 0 | 0 | 0 | 0 | 0 | 0 | 0 | 0 | 1 | 0 | 0 | 0 | 0 | 0 | 0 | 0 | 0 | 0 | 0 |
| 8 | 0 | 0 | 0 | 0 | 0 | 0 | 0 | 0 | 0 | 0 | 1 | 0 | 0 | 0 | 0 | 0 | 0 | 0 | 0 | 0 |
| 9 | 0 | 0 | 0 | 0 | 0 | 0 | 0 | 0 | 0 | 0 | 0 | 1 | 0 | 0 | 0 | 0 | 0 | 0 | 0 | 0 |
| 10 | 0 | 0 | 0 | 0 | 0 | 0 | 0 | 0 | 0 | 0 | 0 | 0 | 1 | 0 | 0 | 0 | 0 | 0 | 0 | 0 |
| 11 | 0 | 0 | 0 | 0 | 0 | 0 | 0 | 0 | 0 | 0 | 0 | 0 | 0 | 1 | 0 | 0 | 0 | 0 | 0 | 0 |
| ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ |

FIG.9

| SECTION LABEL | CENTER VALUE [kN] | CONFIDENCE LEVEL | CUMULATIVE SUM OF CONFIDENCE LEVELS |
|---|---|---|---|
| [−1000,−900) | −950 | 0.00 | 0.00 |
| [−900,−800) | −850 | 0.00 | 0.00 |
| [−800,−700) | −750 | 0.00 | 0.00 |
| [−700,−600) | −650 | 0.01 | 0.01 |
| [−600,−500) | −550 | 0.05 | 0.06 |
| [−500,−400) | −450 | 0.15 | 0.21 |
| [−400,−300) | −350 | 0.14 | 0.35 |
| [−300,−200) | −250 | 0.13 | 0.48 |
| [−200,−100) | −150 | 0.21 | 0.69 |
| [−100,0) | −50 | 0.20 | 0.89 |
| [0,+100) | 50 | 0.09 | 0.98 |
| [+100,+200) | 150 | 0.02 | 1.00 |
| [+200,+300) | 250 | 0.00 | 1.00 |
| [+300,+400) | 350 | 0.00 | 1.00 |
| [+400,+500) | 450 | 0.00 | 1.00 |
| [+500,+600) | 550 | 0.00 | 1.00 |
| [+600,+700) | 650 | 0.00 | 1.00 |
| [+700,+800) | 750 | 0.00 | 1.00 |
| [+800,+900) | 850 | 0.00 | 1.00 |
| [+900,+1000) | 950 | 0.00 | 1.00 |

LEARNED MODEL AND MANAGEMENT APPARATUS FOR INJECTION MOLDING MACHINE

CROSS-REFERENCE TO RELATED APPLICATION

The present application is based on and claims priority under 35 U.S.C. § 119 to Japanese Patent Application No. 2023-181176, filed on Oct. 20, 2023, the contents of which are incorporated herein by reference in their entirety.

BACKGROUND

Technical Field

The present invention relates to a learned model and a management apparatus for an injection molding machine.

Description of Related Art

Conventionally, in order to properly generate a product in an injection molding machine, it is necessary to make an appropriate setting for the product. In order to make the setting, the quality of the product produced by the setting has been checked, and the setting has been readjusted repeatedly to derive an appropriate setting. Therefore, the setting has required time and labor for the technician.

In recent years, with the improvement of the processing capability of computers, artificial intelligence tends to develop. For example, a conventional technology proposes a technique for estimating the quality by machine learning.

SUMMARY

There is provided a learned model including an input layer; one or two or more intermediate layers connected to the input layer; and an output layer connected to the intermediate layer, wherein the learned model causes a computer to function to perform machine learning based on first data indicating a result detected while a product is being produced by an injection molding machine or a result of measuring the product after the product is produced, and ground truth information indicating whether a value included in a section is ground truth for each section, each section being obtained by dividing an amount relating to production of the product into two or more sections, and output, from the output layer, a degree to which the value included in the section is the ground truth for each section, when second data is input from the input layer, the second data indicating the result detected while the product is being produced or the result of measuring the product after the product is produced.

BRIEF DESCRIPTION OF THE DRAWINGS

FIG. 5 illustrates various parameters for each shot number used in the evaluation acquiring part and the ground truth information calculating part according to the first embodiment;

FIG. 7 illustrates information related to the ground truth generated by the ground truth information calculating part according to the first embodiment;

FIG. 9 illustrates information based on the row vector output from the inference part according to the first embodiment;

DETAILED DESCRIPTION

Figure 1:
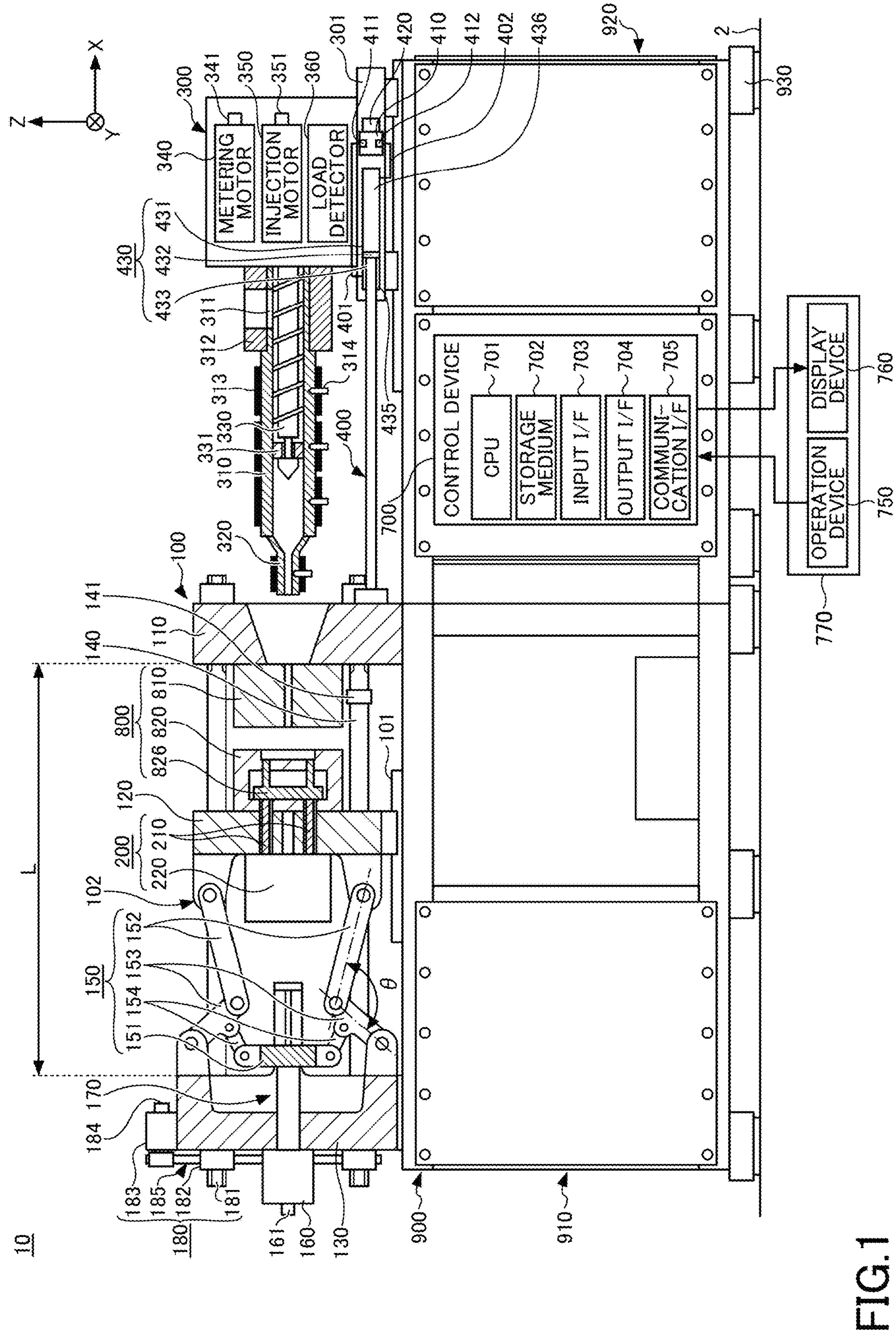
FIG. 1 is a diagram illustrating a state of the injection molding machine according to an embodiment when the mold opening is completed.

In the technique described in the conventional technology, the quality is estimated from detection data detected during molding by using a learned model, but it is difficult to identify how reliable the estimated quality is.

An aspect of the present invention provides a technology that enables setting and control in consideration of reliability, by dividing a quantity related to the production of a product into two or more sections and outputting the degree of ground truth for each section.

According to an aspect of the invention, safety is improved by considering reliability.

Embodiments of the present invention will be described below with reference to the drawings. Further, the embodiments described below are not intended to limit the invention but are examples, and all the features and combinations thereof described in the embodiments are not necessarily essential to the invention. The same or corresponding elements in the respective drawings are denoted by the same or corresponding reference numerals, and the description thereof may be omitted.

Figure 2:
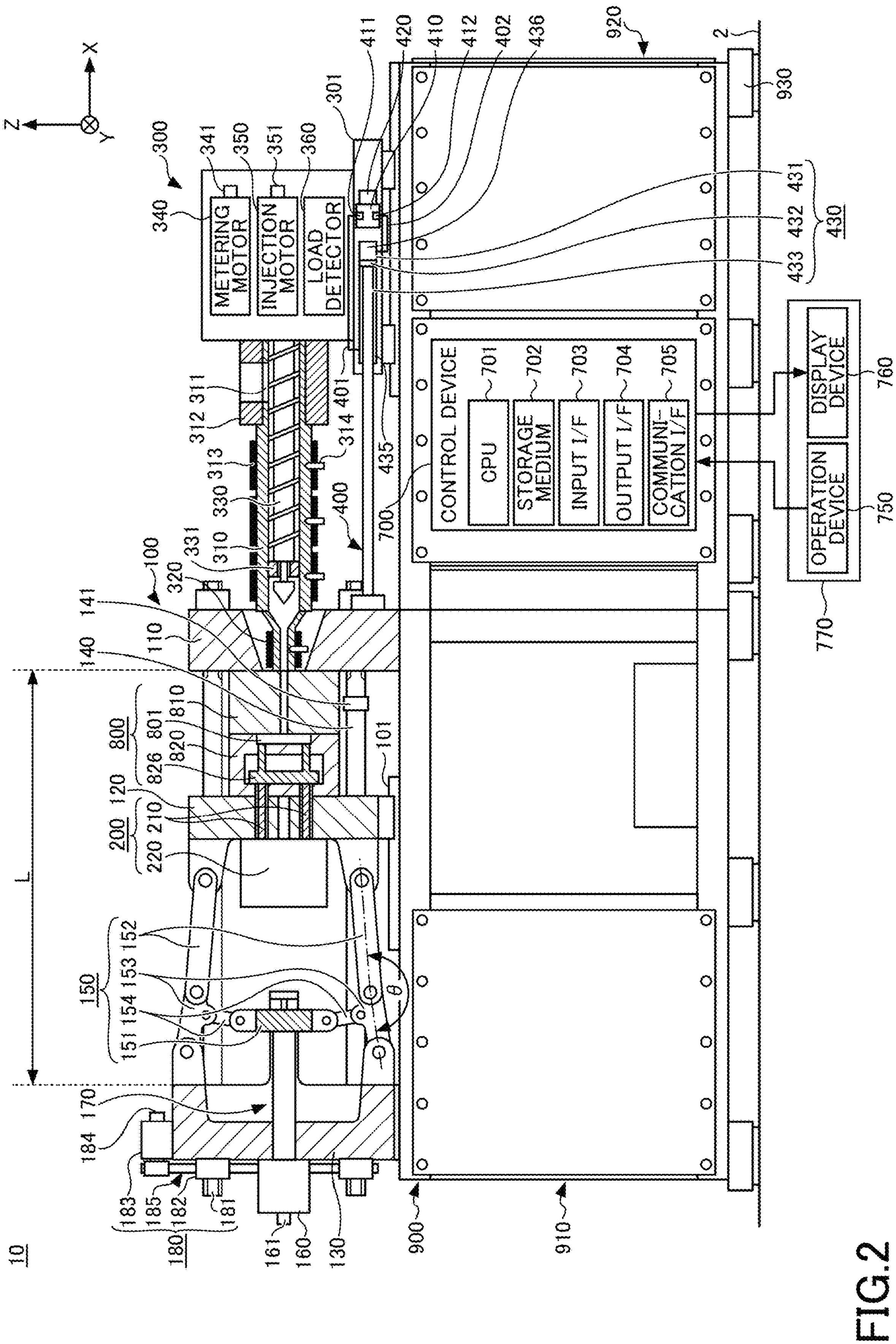
FIG. 2 is a diagram illustrating a state of the injection molding machine according to an embodiment when the mold is clamped.

FIG. 1 is a diagram illustrating a state of the injection molding machine according to the first embodiment when mold opening is completed. FIG. 2 is a diagram illustrating a state of the injection molding machine according to the first embodiment at the time of mold clamping. In the present specification, the X-axis direction, the Y-axis direction, and the Z-axis direction are directions perpendicular to each other. The X-axis direction and the Y-axis direction represent horizontal directions, and the Z-axis direction represents a vertical direction. When a mold clamping unit 100 is a horizontal mold, the X-axis direction is the mold opening/closing direction, and the Y-axis direction is the width direction of an injection molding machine 10. The negative side in the Y-axis direction is referred to as the operating side, and the positive side in the Y-axis direction is referred to as the anti-operating side.

As illustrated in FIGS. 1 and 2, the injection molding machine 10 has the mold clamping unit 100 for opening and closing a mold unit 800, an ejector device 200 for ejecting a molding product molded by the mold unit 800, an injection unit 300 for injecting a molding material into the mold unit 800, a moving device 400 for advancing and retracting the injection unit 300 with respect to the mold unit 800, a control device 700 for controlling each element of the injection molding machine 10, and a frame 900 for supporting each element of the injection molding machine 10. The frame 900 includes a mold clamping unit frame 910 for supporting the mold clamping unit 100, and an injection unit frame 920 for supporting the injection unit 300. The mold clamping unit frame 910 and the injection unit frame 920 are respectively installed on a floor 2 via a leveling adjuster 930. The control device 700 is arranged in the internal space of the injection unit frame 920. Hereinafter, each element of the injection molding machine 10 will be described.

(Mold Clamping Unit)

In the description of the mold clamping unit 100, the moving direction of a movable platen 120 when the mold is closed (for example, the positive X-axis direction) is assumed to be forward, and the moving direction of the movable platen 120 when the mold is opened (for example, the negative X-axis direction) is assumed to be backward.

The mold clamping unit 100 performs mold closing, pressure boosting, mold clamping, depressurizing, and mold opening of the mold unit 800. The mold unit 800 includes a stationary mold 810 and a movable mold 820. The mold clamping unit 100 is, for example, a horizontal mold, and the mold opening/closing direction is a horizontal direction. The mold clamping unit 100 has a stationary platen 110 to which the stationary mold 810 is attached, the movable platen 120 to which the movable mold 820 is attached, and a moving mechanism 102 for moving the movable platen 120 relative to the stationary platen 110 in the mold opening/closing direction.

The stationary platen 110 is fixed to a mold clamping unit frame 910. The stationary mold 810 is attached to a surface of the stationary platen 110 facing the movable platen 120.

The movable platen 120 is arranged to be movable relative to the mold clamping unit frame 910 in the mold opening/closing direction. A guide 101 for guiding the movable platen 120 is laid on the mold clamping unit frame 910. A movable mold 820 is mounted on a surface of the movable platen 120 facing the stationary platen 110.

The moving mechanism 102 performs mold closing, pressure boosting, mold clamping, depressurizing, and mold opening of the mold unit 800 by moving the movable platen 120 forward and backward with respect to the stationary platen 110. The moving mechanism 102 has a toggle support 130 arranged at an interval from the stationary platen 110, a tie bar 140 for connecting the stationary platen 110 and the toggle support 130, a toggle mechanism 150 for moving the movable platen 120 relative to the toggle support 130 in the mold opening/closing direction, a mold clamping motor 160 for operating the toggle mechanism 150, a motion converting mechanism 170 for converting the rotational motion of the mold clamping motor 160 into linear motion, and a mold thickness adjusting mechanism 180 for adjusting the interval between the stationary platen 110 and the toggle support 130.

The toggle support 130 is arranged at an interval from the stationary platen 110, and is mounted on the mold clamping unit frame 910 so as to be movable in the mold opening/closing direction. The toggle support 130 may be arranged so as to be movable along a guide laid on the mold clamping unit frame 910. The guide of the toggle support 130 may be common to the guide 101 of the movable platen 120.

In the present embodiment, the stationary platen 110 is fixed to the mold clamping unit frame 910 and the toggle support 130 is arranged movably relative to the mold clamping unit frame 910 in the mold opening/closing direction, but the toggle support 130 may be fixed to the mold clamping unit frame 910 and the stationary platen 110 may be arranged movably relative to the mold clamping unit frame 910 in the mold opening/closing direction.

The tie bar 140 connects the stationary platen 110 and the toggle support 130 at an interval L in the mold opening/closing direction. A plurality of tie bars 140 (for example, four tie bars) may be used. The plurality of tie bars 140 are arranged parallel to the mold opening/closing direction and extend according to the mold clamping force. At least one tie bar 140 may be provided with a tie bar strain detector 141 for detecting the strain of the tie bar 140. The tie bar strain detector 141 sends a signal indicating the detection result to the control device 700. The detection result of the tie bar strain detector 141 is used for detecting the mold clamping force.

In the present embodiment, the tie bar strain detector 141 is used as the mold clamping force detector for detecting the mold clamping force, but the present invention is not limited thereto. The mold clamping force detector is not limited to a strain gauge type, and may be a piezoelectric type, a capacitive type, a hydraulic type, an electromagnetic type, or the like, and the mounting position thereof is not limited to the tie bar 140.

The toggle mechanism 150 is arranged between the movable platen 120 and the toggle support 130, and moves the movable platen 120 relative to the toggle support 130 in the mold opening/closing direction. The toggle mechanism 150 has a crosshead 151 that moves in the mold opening/closing direction, and a pair of link groups that bend and extend by the movement of the crosshead 151. Each link group of the pair of link groups has a first link 152 and a second link 153 that are flexibly connected by pins or the like. The first link 152 is pivotably attached to the movable platen 120 by pins or the like. The second link 153 is pivotably attached to the toggle support 130 by pins or the like. The second link 153 is attached to the crosshead 151 via a third link 154. When the crosshead 151 is advanced/retracted with respect to the toggle support 130, the first link 152 and the second link 153 are bent/extended, and the movable platen 120 is advanced/retracted with respect to the toggle support 130.

The configuration of the toggle mechanism 150 is not limited to the configuration illustrated in FIGS. 1 and 2. For example, in FIGS. 1 and 2, the number of nodes of each link group is five, but the number of nodes may be four, and one end of the third link 154 may be connected to the node between the first link 152 and the second link 153.

The mold clamping motor 160 is attached to the toggle support 130 and operates the toggle mechanism 150. The mold clamping motor 160 causes the crosshead 151 to move back and forth with respect to the toggle support 130, thereby bending and extending the first link 152 and the second link 153, and moving the movable platen 120 back and forth with respect to the toggle support 130. The mold clamping motor 160 is directly connected to the motion converting mechanism 170, but may be connected to the motion converting mechanism 170 via a belt or a pulley.

The motion converting mechanism 170 converts the rotational motion of the mold clamping motor 160 into the linear motion of the crosshead 151. The motion converting mechanism 170 includes a screw shaft and a screw nut screwed to the screw shaft. A ball or roller may be interposed between the screw shaft and the screw nut.

The mold clamping unit 100 performs a mold closing step, a pressure boosting step, a mold clamping step, a depressurizing step, and a mold opening step under the control of the control device 700.

In the mold closing step, the movable platen 120 is advanced by driving the mold clamping motor 160 to advance the crosshead 151 to the mold closing completion position at a set moving speed, and the movable mold 820 is touched to the stationary mold 810. The position and moving speed of the crosshead 151 are detected by using, for example, a mold clamping motor encoder 161. The mold clamping motor encoder 161 detects the rotation of the mold clamping motor 160 and sends a signal indicating the detection result to the control device 700.

The crosshead position detector for detecting the position of the crosshead 151 and the crosshead moving speed detector for detecting the moving speed of the crosshead 151 are not limited to the mold clamping motor encoder 161, and general detectors can be used. The movable platen position detector for detecting the position of the movable platen 120 and the movable platen moving speed detector for detecting the moving speed of the movable platen 120 are not limited to the mold clamping motor encoder 161, and general detectors can be used.

In the pressure boosting step, the mold clamping force is generated by further driving the mold clamping motor 160 to further advance the crosshead 151 from the mold closing completion position to the mold clamping position.

In the mold clamping step, the mold clamping motor 160 is driven to maintain the position of the crosshead 151 at the mold clamping position. In the mold clamping step, the mold clamping force generated in the pressure boosting step is maintained. In the mold clamping step, a cavity space 801 (see FIG. 2) is formed between the movable mold 820 and the stationary mold 810, and the injection unit 300 fills the cavity space 801 with a liquid molding material. The filled molding material is solidified to obtain a molding product.

The number of cavity spaces 801 may be one or more. In the latter case, a plurality of molding products are obtained simultaneously. An insert material may be arranged in a portion of cavity space 801, and another portion of cavity space 801 may be filled with molding material. A molding product in which the insert material and the molding material are integrated is obtained.

In the depressurizing step, the mold clamping motor 160 is driven to retract the crosshead 151 from the mold clamping position to the mold opening start position, thereby retracting the movable platen 120 and reducing the mold clamping force. The mold opening start position and the mold closing completion position may be the same position.

In the mold opening step, the mold clamping motor 160 is driven to retract the crosshead 151 from the mold opening start position to the mold opening completion position at a set moving speed, thereby retracting the movable platen 120 and separating the movable mold 820 from the stationary mold 810. Thereafter, the ejector device 200 ejects the molding product from the movable mold 820.

The setting conditions in the mold closing step, the pressure boosting step, and the mold clamping step are collectively set as a series of setting conditions. For example, the moving speed, the position (including the mold closing start position, the moving speed switching position, the mold closing completion position, and the mold clamping position), and the mold clamping force of the crosshead 151 in the mold closing step and the pressure boosting step are collectively set as a series of setting conditions. The mold closing start position, the moving speed switching position, the mold closing completion position, and the mold clamping position are arranged in this order from the rear side to the front side, and represent the starting point and the ending point of the section in which the moving speed is set. The moving speed is set for each section. One or more moving speed switching positions may be used. The moving speed switching position may not be set. Only either one the mold clamping position or the mold clamping force may be set.

Setting conditions in the depressurizing step and the mold opening step are set in the same way. For example, the moving speed and the position (the mold opening start position, the moving speed switching position, and the mold opening completion position) of the crosshead 151 in the depressurizing step and the mold opening step are set together as a series of setting conditions. The mold opening start position, the moving speed switching position, and the mold opening completion position are arranged in this order from the front side to the rear side, and represent the starting point and the ending point of the section in which the moving speed is set. The moving speed is set for each section. The moving speed switching position may be one or a plurality of positions. The moving speed switching position may not be set. The mold opening start position and the mold closing completion position may be the same position. The mold opening completion position and the mold closing start position may be the same position.

Instead of the moving speed and the position of the crosshead 151, the moving speed, the position, or the like, of the movable platen 120 may be set. Further, the mold clamping force may be set instead of the position of the crosshead (for example, the mold clamping position) and the position of the movable platen.

The toggle mechanism 150 amplifies the driving force of the mold clamping motor 160 and transmits the driving force to the movable platen 120. The amplification factor thereof is also referred to as a toggle factor. The toggle factor varies according to an angle θ (hereinafter also referred to as a "link angle θ") formed between the first link 152 and the second link 153. The link angle θ is obtained from the position of the crosshead 151. When the link angle θ is 180°, the toggle factor is maximum.

When the thickness of the mold unit 800 changes due to replacement of the mold unit 800, the temperature change of the mold unit 800, or the like, the mold thickness is adjusted so that a predetermined mold clamping force can be obtained during mold clamping. In the mold thickness adjustment, for example, the interval L between the stationary platen 110 and the toggle support 130 is adjusted such that the link angle θ of the toggle mechanism 150 becomes a predetermined angle at the time of mold touch when the movable mold 820 touches the stationary mold 810.

The mold clamping unit 100 has a mold thickness adjusting mechanism 180. The mold thickness adjusting mechanism 180 adjusts the interval L between the stationary platen 110 and the toggle support 130 to adjust the mold thickness. The timing when the mold thickness adjustment is performed is, for example, between a time point of the end of a molding cycle and the start of the next molding cycle. The mold thickness adjusting mechanism 180 has, for example, a screw shaft 181 formed at the rear end portion of the tie bar 140, a screw nut 182 rotatably and non-retractably held by the toggle support 130, and a mold thickness adjusting motor 183 for rotating the screw nut 182 screwed to the screw shaft 181.

The screw shaft 181 and the screw nut 182 are provided for each tie bar 140. The rotational driving force of the mold thickness adjusting motor 183 may be transmitted to a plurality of screw nuts 182 via a rotational driving force transmitting part 185. The plurality of screw nuts 182 can be rotated synchronously. It is also possible to individually rotate the plurality of screw nuts 182 by changing the transmission path of the rotational driving force transmitting part 185.

The rotational driving force transmitting part 185 is configured by, for example, gears. In this case, a driven gear is formed on the outer periphery of each screw nut 182, a driving gear is mounted on the output shaft of the mold thickness adjusting motor 183, and an intermediate gear meshed with the plurality of driven gears and driving gears is rotatably held in the central portion of the toggle support 130. The rotational driving force transmitting part 185 may be configured by, for example, a belt or a pulley instead of gears.

The operation of the mold thickness adjusting mechanism 180 is controlled by the control device 700. The control device 700 drives the mold thickness adjusting motor 183 to rotate the screw nut 182. As a result, the position of the toggle support 130 with respect to the tie bar 140 is adjusted, and the interval L between the stationary platen 110 and the toggle support 130 is adjusted. A plurality of mold thickness adjusting mechanisms may be used in combination.

The interval L is detected by using the mold thickness adjusting motor encoder 184. The mold thickness adjusting motor encoder 184 detects the amount and direction of rotation of the mold thickness adjusting motor 183, and sends a signal indicating the detection result to the control device 700. The detection result of the mold thickness adjusting motor encoder 184 is used for monitoring and controlling the position of the toggle support 130 and the interval L. The toggle support position detector for detecting the position of the toggle support 130 and the interval detector for detecting the interval L are not limited to the mold thickness adjusting motor encoder 184, and general detectors can be used.

The mold clamping unit 100 may include a mold temperature control device for adjusting the temperature of the mold unit 800. The mold unit 800 has a flow path for a temperature controlling medium inside. The mold temperature control device adjusts the temperature of the mold unit 800 by adjusting the temperature of the temperature controlling medium supplied to the flow path of the mold unit 800.

The mold clamping unit 100 of the present embodiment is a horizontal type in which the mold opening/closing direction is horizontal, but may be a vertical type in which the mold opening/closing direction is vertical.

The mold clamping unit 100 of the present embodiment has the mold clamping motor 160 as a driving source, but may have a hydraulic cylinder instead of the mold clamping motor 160. The mold clamping unit 100 may have a linear motor for mold opening/closing and an electromagnet for mold clamping.

(Ejector Device)

In the description of the ejector device 200, as in the description of the mold clamping unit 100, the moving direction (e.g., the positive X-axis direction) of the movable platen 120 when the mold is closed is assumed to be forward, and the moving direction (e.g., the negative X-axis direction) of the movable platen 120 when the mold is opened is assumed to be backward.

The ejector device 200 is attached to the movable platen 120 and moves forward and backward together with the movable platen 120. The ejector device 200 has an ejector rod 210 for ejecting a molding product from the mold unit 800, and a driving mechanism 220 for moving the ejector rod 210 in the moving direction (X-axis direction) of the movable platen 120.

The ejector rod 210 is arranged in a through-hole of the movable platen 120 so as to move forward and backward. The front end of the ejector rod 210 contacts the ejector plate 826 of the movable mold 820. The front end of the ejector rod 210 may or may not be connected to the ejector plate 826.

The driving mechanism 220 includes, for example, an ejector motor and a motion conversion mechanism for converting the rotational motion of the ejector motor into a linear motion of the ejector rod 210. The motion conversion mechanism includes a screw shaft and a screw nut screwed into the screw shaft. A ball or roller may be interposed between the screw shaft and the screw nut.

The ejector device 200 performs an ejection step under the control of the control device 700. In the ejection step, the ejector plate 826 is advanced by advancing the ejector rod 210 from the standby position to the ejection position at a set moving speed, and the molding product is ejected. Thereafter, the ejector motor is driven to retract the ejector rod 210 at the set moving speed, and the ejector plate 826 is retracted to the original standby position.

The position and moving speed of the ejector rod 210 are detected, for example, by using an ejector motor encoder. The ejector motor encoder detects rotation of the ejector motor and sends a signal indicating the detection result to the control device 700. The ejector rod position detector for detecting the position of the ejector rod 210 and the ejector rod moving speed detector for detecting the moving speed of the ejector rod 210 are not limited to the ejector motor encoder, and general detectors can be used.

(Injection Unit)

In the description of the injection unit 300, unlike the description of the mold clamping unit 100 and the description of the ejector device 200, the moving direction of the screw 330 during filling (for example, the negative X-axis direction) is assumed to be forward, and the moving direction of the screw 330 during metering (for example, the positive X-axis direction) is assumed to be backward.

The injection unit 300 is installed on a slide base 301, and the slide base 301 is arranged so as to be freely advanced and retracted with respect to the injection unit frame 920. The injection unit 300 is arranged so as to be freely advanced and retracted with respect to the mold unit 800. The injection unit 300 touches the mold unit 800, and fills the cavity space 801 in the mold unit 800 with the molding material measured in the cylinder 310. The injection unit 300 includes, for example, a cylinder 310 for heating the molding material, a nozzle 320 provided at the front end of the cylinder 310, a screw 330 arranged so as to be freely advanced and retracted and rotatable in the cylinder 310, a metering motor 340 for rotating the screw 330, an injection motor 350 for advancing and retracting the screw 330, and a load detector 360 for detecting the load transmitted between the injection motor 350 and the screw 330.

The cylinder 310 heats a molding material supplied to the inside through the supply port 311. The molding material contains, for example, resin or the like. The molding material is formed, for example, into a pellet shape and is supplied in a solid state to the supply port 311. The supply port 311 is formed at the rear of the cylinder 310. A cooler 312 such as a water-cooled cylinder or the like is provided on the outer periphery of the rear of the cylinder 310. A heater 313 such as a band heater and a temperature detector 314 are provided on the outer periphery of the cylinder 310 in front of the cooler 312.

The cylinder 310 is divided into a plurality of zones in the axial direction (e.g., X-axis direction) of the cylinder 310. A heater 313 and a temperature detector 314 are provided in each of the plurality of zones. A set temperatures is set in each of the plurality of zones, and a control device 700 controls the heater 313 so that the temperature detected by the temperature detector 314 becomes the set temperature.

The nozzle 320 is provided at the front end of the cylinder 310 and pressed against the mold unit 800. A heater 313 and a temperature detector 314 are provided on the outer periphery of the nozzle 320. A control device 700 controls the heater 313 so that the detected temperature of the nozzle 320 becomes the set temperature.

The screw 330 is arranged in the cylinder 310 so as to be rotatable and freely advanced and retracted. When the screw 330 is rotated, the molding material is fed forward along the spiral groove of the screw 330. The molding material is gradually melted by the heat from the cylinder 310 as the molding material is fed forward. As the liquid molding material is fed forward of the screw 330 and accumulated in the front of the cylinder 310, the screw 330 is retracted. Then, as the screw 330 is advanced, the liquid molding material accumulated in front of the screw 330 is ejected from the nozzle 320 and filled into the mold unit 800.

A backflow prevention ring 331 is mounted on the front of the screw 330 so as to be movable forward and backward as a backflow prevention valve for preventing backflow of molding material from the front of the screw 330 toward the rear when the screw 330 is pushed forward.

When the screw 330 is advanced, the backflow prevention ring 331 is pushed backward by the pressure of molding material in front of the screw 330 and retracts relative to the screw 330 to a closed position (see FIG. 2) blocking the flow path of molding material. This prevents backflow of molding material accumulated in front of the screw 330 to the back side.

On the other hand, when the screw 330 is rotated, the backflow prevention ring 331 is pushed forward by the pressure of molding material sent forward along the spiral groove of the screw 330 and advances relative to the screw 330 to an open position (see FIG. 1) opening the flow path of molding material. This causes molding material to be sent in front of the screw 330.

The backflow prevention ring 331 may be either a co-rotating type that rotates together with the screw 330 or a non-co-rotating type that does not rotate together with the screw 330.

Incidentally, the injection unit 300 may have a driving source for moving the backflow prevention ring 331 forward and backward with respect to the screw 330 between the open position and the closed position.

The metering motor 340 rotates the screw 330. The driving source for rotating the screw 330 is not limited to the metering motor 340, and may be, for example, a hydraulic pump.

The injection motor 350 moves the screw 330 forward and backward. A motion converting mechanism for converting the rotational motion of the injection motor 350 into the linear motion of the screw 330 is provided between the injection motor 350 and the screw 330. The motion converting mechanism has, for example, a screw shaft and a screw nut screwed with the screw shaft. A ball, a roller, or the like may be provided between the screw shaft and the screw nut. The driving source for moving the screw 330 forward and backward is not limited to the injection motor 350 and may be, for example, a hydraulic cylinder.

The load detector 360 detects a load transmitted between the injection motor 350 and the screw 330. The detected load is converted into pressure by the control device 700. The load detector 360 is provided in a load transmission path between the injection motor 350 and the screw 330 and detects a load acting on the load detector 360.

The load detector 360 sends a signal of the detected load to the control device 700. The load detected by the load detector 360 is converted into a pressure acting between the screw 330 and the molding material, and is used to control and monitor the pressure exerted by the screw 330 from the molding material, the back pressure exerted on the screw 330, and the pressure exerted by the screw 330 on the molding material.

The pressure detector for detecting the pressure of the molding material is not limited to the load detector 360, and a general detector can be used. For example, a nozzle pressure sensor or a mold pressure sensor may be used. The nozzle pressure sensor is located in the nozzle 320.

The injection unit 300 performs the metering, filling, and hold pressure steps under the control of the control device 700. The filling and hold pressure steps may be collectively referred to as the injection step.

In the metering step, the metering motor 340 is driven to rotate the screw 330 at a set rotation speed to feed the molding material forward along the spiral grooves of the screw 330. As a result, the molding material is gradually melted. As the liquid molding material is fed in front of the screw 330 and accumulated in the front of the cylinder 310, the screw 330 is retracted. The rotation speed of the screw 330 is detected, for example, by using the metering motor encoder 341. The metering motor encoder 341 detects the rotation of the metering motor 340 and sends a signal indicating the detection result to the control device 700. The screw rotation speed detector for detecting the rotation speed of the screw 330 is not limited to the metering motor encoder 341, and a general detector can be used.

In the metering process, a setback pressure may be applied to the screw 330 by driving the injection motor 350 in order to limit the rapid retraction of the screw 330. The back pressure on the screw 330 is detected, for example, by using the load detector 360. When the screw 330 retracts to the metering completion position and a predetermined amount of molding material is accumulated in front of the screw 330, the metering process is completed.

The position and rotation speed of the screw 330 in the metering process are set together as a series of setting conditions. For example, a metering start position, a rotation speed switching position, and a metering completion position are set. These positions are arranged in this order from front to rear, and represent the start point and the end point of the section in which the rotation speed is set. A rotation speed is set for each section. The rotation speed switching position may be one or more. The rotation speed switching position may not be set. A back pressure is set for each section.

In the filling step, the injection motor 350 is driven to advance the screw 330 at a set moving speed, and the liquid molding material accumulated in front of the screw 330 is filled into the cavity space 801 in the mold unit 800. The position and moving speed of the screw 330 are detected by using, for example, an injection motor encoder 351. The injection motor encoder 351 detects the rotation of the injection motor 350 and sends a signal indicating the detection result to the control device 700. When the position of the screw 330 reaches the set position, the filling step is switched to the hold pressure step (what is referred to as V/P switching). The position where the V/P switching is performed is also referred to as a V/P switching position. The set moving speed of the screw 330 may be changed in accordance with the position and time of the screw 330.

The position and moving speed of the screw 330 in the filling process are collectively set as a series of setting conditions. For example, a filling start position (also referred to as an injection start position), a moving speed switching position, and a V/P switching position are set. These positions are arranged in this order from the rear side to the front side, and represent the start point and the end point of the section in which the moving speed is set. The moving speed is set for each section. One or more moving speed switching positions may be set. The moving speed switching positions may not be set.

The upper limit of the pressure of the screw 330 is set for each section in which the moving speed of the screw 330 is set. The pressure of the screw 330 is detected by the load detector 360. When the pressure of the screw 330 is equal to or less than the set pressure, the screw 330 is advanced at the set moving speed. On the other hand, when the pressure of the screw 330 exceeds the set pressure, the screw 330 is advanced at a moving speed slower than the set moving speed so that the pressure of the screw 330 becomes equal to or less than the set pressure for the purpose of mold protection.

After the position of the screw 330 reaches the V/P switching position in the filling step, the screw 330 may be temporarily stopped at the V/P switching position, and then the V/P switching may be performed. Immediately before the V/P switching, instead of stopping the screw 330, the screw 330 may be slightly advanced or slightly retracted. The screw position detector for detecting the position of the screw 330 and the screw moving speed detector for detecting the moving speed of the screw 330 are not limited to the injection motor encoder 351, and general detectors may be used.

In the pressure holding step, the injection motor 350 is driven to push the screw 330 forward, the pressure (hereinafter, also referred to as "hold pressure") of the molding material at the front end of the screw 330 is maintained at a set pressure, and the molding material remaining in the cylinder 310 is pushed toward the mold unit 800. A shortage of the molding material due to cooling shrinkage in the mold unit 800 can be replenished. The hold pressure is detected, for example, by using the load detector 360. The setting value of the hold pressure may be changed according to the elapsed time from the start of the hold pressure step. The hold pressure in the hold pressure step and the holding time for holding the hold pressure may be set in plural numbers, and may be set collectively as a series of setting conditions.

In the hold pressure step, the molding material in the cavity space 801 in the mold unit 800 is gradually cooled, and when the hold pressure step is completed, the inlet of the cavity space 801 is closed with the solidified molding material. This state is referred to as a gate seal, and backflow of the molding material from the cavity space 801 is prevented. After the hold pressure step, the cooling step is started. In the cooling step, the molding material in the cavity space 801 is solidified. To reduce the molding cycle time, a metering step may be performed during the cooling step.

The injection unit 300 of the present embodiment is an in-line screw type, but may be a preplasticating type or the like. The preplasticating type injection unit supplies the molding material melted in the plasticizing cylinder to the injection cylinder, and injects the molding material from the injection cylinder into the mold unit. In the plasticizing cylinder, a screw is arranged so as to be freely rotatable but incapable of being advanced or retracted, or the screw is arranged so as to be freely rotatable and freely advanced or retracted. On the other hand, in the injection cylinder, a plunger is arranged so as to be freely advanced or retracted.

The injection unit 300 of the present embodiment is a horizontal type in which the axial direction of the cylinder 310 is horizontal, but may be a vertical type in which the axial direction of the cylinder 310 is vertical. The mold clamping unit combined with the vertical injection unit 300 may be a vertical type or a horizontal type. Similarly, the mold clamping unit combined with the horizontal injection unit 300 may be a horizontal type or a vertical type.

(Moving Device)

In the description of the moving device 400, as in the description of the injection unit 300, the moving direction (for example, the negative X-axis direction) of the screw 330 during filling is forward, and the moving direction (for example, the positive X-axis direction) of the screw 330 during metering is backward.

The moving device 400 moves the injection unit 300 forward and backward with respect to the mold unit 800. The moving device 400 also presses the nozzle 320 against the mold unit 800 to generate nozzle touch pressure. The moving device 400 includes a hydraulic pump 410, a motor 420 as a driving source, and a hydraulic cylinder 430 as a hydraulic actuator.

The hydraulic pump 410 has a first port 411 and a second port 412. The hydraulic pump 410 is a pump rotatable in both directions, and generates hydraulic pressure by sucking hydraulic fluid (for example, oil) from one of the first port 411 or the second port 412 and discharging the hydraulic pressure from the other by switching the rotational direction of the motor 420. The hydraulic pump 410 can also suck hydraulic fluid from a tank and discharge the hydraulic fluid from one of the first port 411 or the second port 412.

The motor 420 operates the hydraulic pump 410. The motor 420 drives the hydraulic pump 410 in a rotational direction and a rotational torque in accordance with a control signal from the control device 700. The motor 420 may be an electric motor or an electric servo motor.

The hydraulic cylinder 430 has a cylinder body 431, a piston 432, and a piston rod 433. The cylinder body 431 is fixed to the injection unit 300. The piston 432 partitions the interior of the cylinder body 431 into a front chamber 435 as a first chamber and a rear chamber 436 as a second chamber. The piston rod 433 is fixed to the stationary platen 110.

The front chamber 435 of the hydraulic cylinder 430 is connected to a first port 411 of the hydraulic pump 410 through a first flow path 401. When the hydraulic fluid discharged from the first port 411 is supplied to the front chamber 435 through the first flow path 401, the injection unit 300 is pushed forward. The injection unit 300 is advanced, and the nozzle 320 is pressed against the stationary mold 810. The front chamber 435 functions as a pressure chamber for generating the nozzle touch pressure of the nozzle 320 by the pressure of the hydraulic fluid supplied from the hydraulic pump 410.

On the other hand, the rear chamber 436 of the hydraulic cylinder 430 is connected to the second port 412 of the hydraulic pump 410 through the second flow path 402. The hydraulic fluid discharged from the second port 412 is supplied to the rear chamber 436 of the hydraulic cylinder 430 through the second flow path 402, and the injection unit 300 is pushed backward. The injection unit 300 is retracted, and the nozzle 320 is separated from the stationary mold 810.

Although the moving device 400 includes the hydraulic cylinder 430 in the present embodiment, the present invention is not limited thereto. For example, instead of the hydraulic cylinder 430, an electric motor and a motion conversion mechanism for converting the rotational motion of the electric motor into the linear motion of the injection unit 300 may be used.

(Control Device)

The control device 700 is configured by a computer, and, as illustrated in FIGS. 1 and 2, the control device 700 includes a central processing unit (CPU) 701, a storage medium 702 such as a memory, an input interface 703, an output interface 704, and a communication interface 705. The control device 700 performs various kinds of control by causing the CPU 701 to execute a program stored in the storage medium 702. The control device 700 receives signals from the outside through the input interface 703 and transmits signals to the outside through the output interface 704.

The control device 700 repeatedly performs a metering step, a mold closing step, a pressure boosting step, a mold clamping step, a filling step, a hold pressure step, a cooling step, a depressurizing step, a mold opening step, an ejection step, and the like to repeatedly produce molding products. A series of operations for obtaining a molding product, for example, operations from the start of a metering step to the start of the next metering step, is also referred to as a "shot" or a "molding cycle". The time required for one shot is also referred to as a "molding cycle time" or a "cycle time".

One molding cycle includes, for example, a metering step, a mold closing step, a pressure boosting step, a mold clamping step, a filling step, a hold pressure step, a cooling step, a depressurizing step, a mold opening step, and an ejection step in this order. The order described above is the order in which each step is started. The filling step, the hold pressure step, and the cooling step are performed during the mold clamping step. The start of the mold clamping step may coincide with the start of the filling step. The completion of the depressurizing step coincides with the start of the mold opening step.

In order to shorten the molding cycle time, multiple steps may be performed simultaneously. For example, the metering step may be performed during the cooling step of the previous molding cycle or during the mold clamping step. In this case, the mold closing step may be performed at the beginning of the molding cycle. The filling step may also be started during the mold closing step. The ejection step may also begin during the mold opening step. If an open-close valve is provided to open and close the flow path of the nozzle 320, the mold opening step may begin during the metering step. This is because even if the mold opening step begins during the metering step, the molding material does not leak from the nozzle 320 if the open-close valve closes the flow path of the nozzle 320.

One molding cycle may include steps other than the metering step, the mold closing step, the pressure boosting step, the mold clamping step, the filling step, the hold pressure step, the cooling step, the depressurizing step, the mold opening step, and the ejection step.

For example, after the completion of the hold pressure step and before the start of the metering step, a pre-metering sack-back step may be performed in which the screw 330 is retracted to a preset metering start position. The pressure of the molding material accumulated in front of the screw 330 before the start of the metering step can be reduced, and a sudden retraction of the screw 330 at the start of the metering step can be prevented.

Also, after the completion of the metering step and before the start of the filling step, a post-metering sack-back step may be performed in which the screw 330 is retracted to a preset filling start position (also referred to as an "injection start position"). The pressure of the molding material accumulated in front of the screw 330 before the start of the filling process can be reduced, and the leakage of the molding material from the nozzle 320 before the start of the filling process can be prevented.

The control device 700 is connected to an operation device 750 that receives an input operation by a user and a display device 760 that displays a screen. The operation device 750 and the display device 760 may be constituted by a touch panel 770, for example, and may be integrated. The touch panel 770 as the display device 760 displays a screen under the control of the control device 700. The screen of the touch panel 770 may display, for example, information such as the setting of the injection molding machine 10 and the current state of the injection molding machine 10. The touch panel 770 can receive an operation in the displayed screen area. Further, the screen area of the touch panel 770 may display, for example, an operation part such as a button or an input field that receives an input operation by a user. The touch panel 770 as the operation device 750 detects an input operation on the screen by a user and outputs a signal corresponding to the input operation to the control device 700. Thus, for example, the user can perform setting (including input of a setting value) of the injection molding machine 10 by operating an operation part provided on the screen while confirming information displayed on the screen. The operation of the injection molding machine 10 corresponding to the operation part can be performed by the user by operating the operation part provided on the screen. The operation of the injection molding machine 10 may be, for example, the operation (including stopping) of the mold clamping unit 100, the ejector device 200, the injection unit 300, the moving device 400, and the like. The operation of the injection molding machine 10 may be, for example, switching of the screen displayed on the touch panel 770 as the display device 760.

Although the operation device 750 and the display device 760 of the present embodiment have been described as being integrated as the touch panel 770, the devices may be provided independently. A plurality of operation devices 750 may be provided. The operation device 750 and the display device 760 are arranged on the operation side (negative Y-axis direction) of the mold clamping unit 100 (more specifically, the stationary platen 110).

First Embodiment

When molding with an injection molding machine, there is a demand for making a setting by using a learned model. In this case, it is necessary to perform machine learning to generate a learned model.

The learning phase of machine learning may be performed by executing a learning process by an injection molding machine. However, there is a problem that the processing apparatus of the injection molding machine requires a high processing capacity. Therefore, the learning process may be performed by an information processing apparatus different from the injection molding machine.

Therefore, in the present embodiment, an example in which the learning phase and the inference phase are performed by different apparatuses will be described. Specifically, the learned model created in the learning phase by the learning device is mounted on the injection molding machine. In the present embodiment, an example in which the learning phase and the inference phase are performed by different apparatuses will be described. However, the method is not limited to the method in which the learning phase and the inference phase are performed by different apparatuses, and the learning phase and the inference phase may be performed by the same apparatus.

Figure 3:
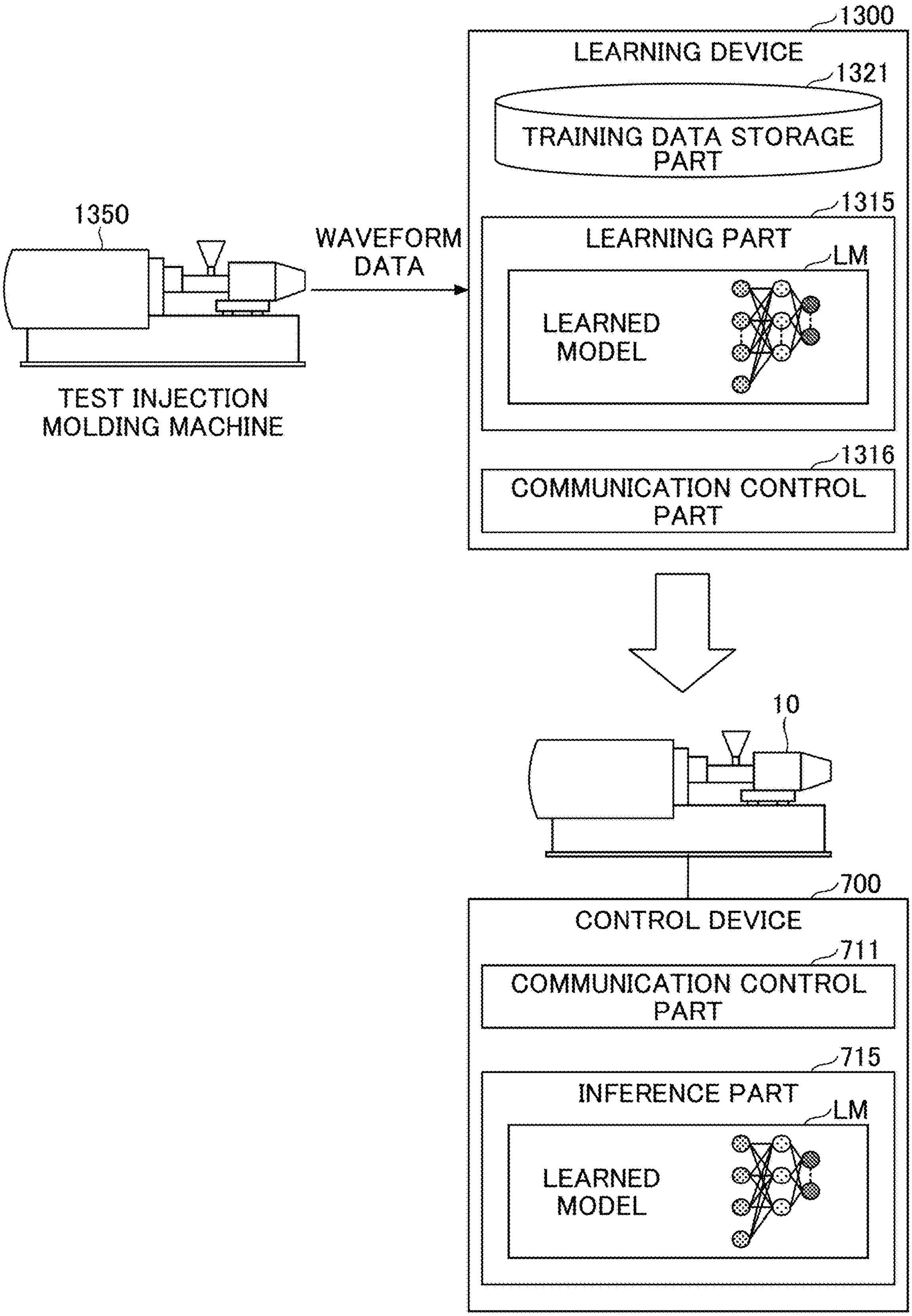
FIG. 3 is a conceptual diagram illustrating cooperation regarding a learned model by a learning device and a control device of an injection molding machine according to a first embodiment.

FIG. 3 is a conceptual diagram illustrating cooperation relating to a learned model by the learning device and the control device of the injection molding machine according to the present embodiment.

In the example illustrated in FIG. 3, a test injection molding machine 1350, a learning device 1300, and a control device 700 of the injection molding machine 10 are illustrated.

In the example illustrated in FIG. 3, it is conceivable that the test injection molding machine 1350 and the learning device 1300 are owned by, for example, the producer of the injection molding machine 10, but the method is not limited to having the producer of the injection molding machine be the owner. For example, the owner may be the shipment destination of the injection molding machine, or by the service provider that generates the learned model. The injection molding machine 10 and the control device 700 illustrated in FIG. 3 may indicate, for example, a situation before shipment.

The test injection molding machine 1350 is an injection molding machine for performing machine learning. The configuration of the test injection molding machine 1350 is the same as that of the injection molding machine 10, and description thereof is omitted.

The test injection molding machine 1350 according to the present embodiment produces molding products (an example of a product) according to the setting by the user. The test injection molding machine 1350 outputs waveform data measured during injection molding to the learning device 1300. In the present embodiment, data indicating the detection results of a sensor provided in the test injection molding machine 1350 or the injection molding machine 10 in chronological order is referred to as waveform data.

The learning device 1300 generates training data based on the input waveform data and stores the training data in the training data storage part 1321.

In order to utilize the artificial intelligence, it is necessary to execute a training phase and an inference phase.

The learning device 1300 executes the learning phase. For this purpose, a learning part 1315 of the learning device 1300 reads the training data stored in the training data storage part 1321 into a neural network, and generates a network adjusted for the synaptic weight and bias as a learned model LM.

For example, the learning device 1300 generates a learned model LM by reading a large amount of training data and performing machine learning by backpropagation using a neural network.

The learning device 1300 may be, for example, an on-premise server installed in a factory or the like or a cloud server. Further, the learning device 1300 may be a stationary terminal device installed in a factory or the like or a portable terminal device (mobile terminal). The stationary terminal device may include, for example, a desktop PC (personal computer). The portable terminal device may include, for example, a smartphone, a tablet terminal, a laptop PC, or the like.

The control device 700 of the injection molding machine 10 executes an inference phase. The control device 700 inputs data to the learned model LM and causes the learned model LM to perform inference. Then, the control device 700 sets a predetermined item of the molding condition based on the output result from the learned model LM.

In the present embodiment, the learned model LM generated by the learning part 1315 of the learning device 1300 and the learned model LM used by an inference part 715 of the control device 700 may have a common structure. Then, the learning device 1300 may deliver the weight and bias of the learned model LM to the control device 700. By updating the learned model LM based on the received weight and bias, the control device 700 can match the updated learned model LM with the learned model LM of the learning part 1315 of the learning device 1300. Thus, the learning part 1315 of the learning device 1300 and the inference part 715 of the control device 700 of the injection molding machine 10 can be implemented in different languages. For example, the learning part 1315 of the learning device 1300 may be implemented by using, for example, Python. On the other hand, the inference part 715 of the control device 700 may be implemented by using, for example, C++.

Further, the learning device 1300 and the control device 700 may have different CPUs, OSs, development languages, and the like. The control device 700 can use a CPU having a lower processing speed than the learning device 1300. Thus, the cost can be reduced.

The structure information of the weight and bias to be transferred need only include the values of the weights, the values of the biases, and parameter structure information, and may be, for example, an object in which the values of the weights and the values of the biases are described according to a data structure by a predetermined method (for example, Javascript Object Notation (JSON), Extensible Markup Language (XML), Open Neural Network Exchange (ONNX), etc.).

Thus, the learning device 1300 can transfer the information indicating the structure of the weight and bias to the control device 700 of the injection molding machine 10.

Note that the present embodiment is not limited to the method of transferring the information indicating the structure of the weight and bias from the learning device 1300 to the injection molding machine 10, but the learned model LM itself may be transferred from the learning device 1300 to the control device 700 of the injection molding machine 10. In this case, the CPU, OS, development language, and the like may be shared between the control device 700 and the learning device 1300.

Thus, the control device 700 can make inferences by using the learned model LM generated in the learning phase of the learning device 1300.

Figure 4:
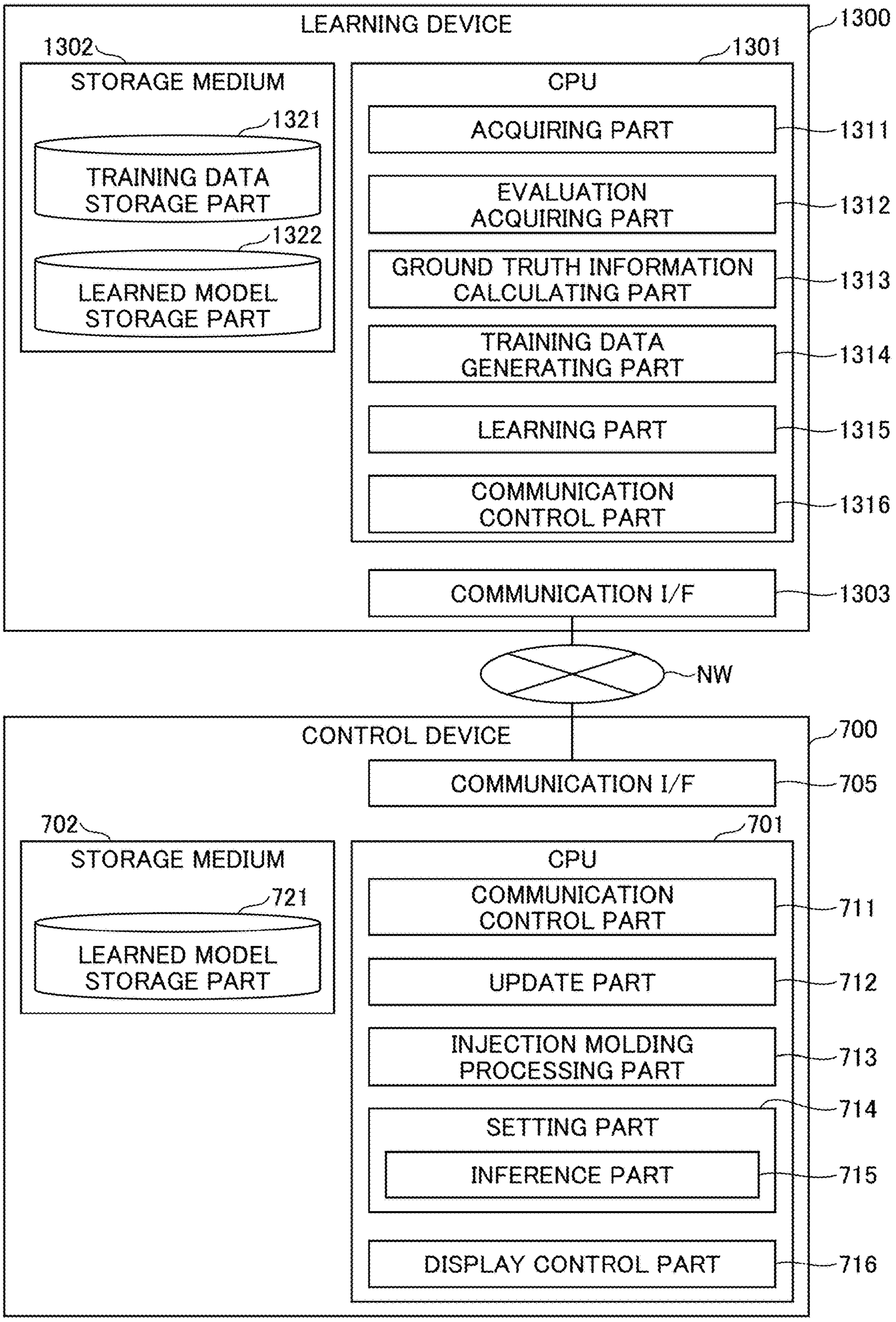
FIG. 4 is a diagram illustrating an example of the functional configuration of the learning device and the control device according to the first embodiment.

FIG. 4 is a diagram illustrating an example of the functional configuration of the learning device 1300 and the control device 700 according to the present embodiment. As illustrated in FIG. 4, the learning device 1300 and the control device 700 are connected by a communication line NW.

The function of the learning device 1300 is implemented by any hardware or any combination of hardware and software. For example, as illustrated in FIG. 4, the learning device 1300 includes a CPU 1301, a storage medium 1302, and a communication interface 1303.

The storage medium 1302 stores various installed programs and also stores files and data necessary for various processes. The storage medium 1302 includes, for example, an HDD (Hard Disc Drive), an SSD (Solid State Drive), a flash memory, and the like.

The storage medium 1302 according to the present embodiment includes a training data storage part 1321 and a learned model storage part 1322.

The training data storage part 1321 stores training data used for learning the learned model LM. The configuration of the training data will be described later.

The learned model storage part 1322 stores the learned model LM.

The communication interface 1303 is used as an interface for connecting with an external device in a communicable manner. Thus, the learning device 1300 can communicate with an external device such as the injection molding machine 10 through the communication interface 1303. Further, the communication interface 1303 may have a plurality of types of communication interfaces depending on a communication method or the like with a connected device.

The CPU 1301 of the learning device 1300 executes a program stored in the storage medium 1302. Thus, the CPU 1301 includes, as functional parts, an acquiring part 1311, an evaluation acquiring part 1312, a ground truth information calculating part 1313, a training data generating part 1314, a learning part 1315, and a communication control part 1316.

The learning device 1300 according to the present embodiment generates a learned model LM according to the configuration described above. The learned model LM divides a range that can be set as an item, which is related to the molding conditions of the injection molding machine 10, into two or more sections, and outputs a confidence level for each section, for example, when waveform data indicating a detection result in chronological order obtained by a sensor provided in the injection molding machine 10 is input, while the injection molding machine 10 is performing injection molding. The confidence level indicates the degree to which a value included in the section is correct (ground truth) as a value to be set for the item. Therefore, a value to be set for the item can be inferred by referring to the output information.

First, a description will be given of a configuration in which the learning device 1300 generates the training data used to generate the learned model LM.

The acquiring part 1311 acquires waveform data (example of first data) indicating the detection result by the sensor provided in the test injection molding machine 1350 from the test injection molding machine 1350 every time injection molding is performed with a setting value set for an item to be set.

In the present embodiment, a description will be given of a case where the item to be set is a mold clamping force setting value. Then, the acquiring part 1311 acquires, from the test injection molding machine 1350, waveform data (example of aggregate data) indicating the mold clamping force detected by the mold clamping force detector from the start to the end of the molding cycle, every time the mold clamping force setting value is set for molding a molding product. In the present embodiment, the waveform data to be acquired is not limited to waveform data indicating the clamping force from the start to the end of the molding cycle, but may be waveform data indicating the clamping force for each shot. For example, the waveform data to be acquired may be waveform data indicating a part or the whole of the molding cycle, or may be waveform data corresponding to shots before and after the molding cycle.

The learning device 1300 according to the present embodiment generates training data for outputting information related to the setting of the mold clamping force setting value. Next, an example of a method of generating the training data will be described. Note that the method of generating the training data is not limited to the generation method described below, and various methods can be considered.

The learning device 1300 according to the present embodiment generates the training data based on the evaluation of the molding product produced by injection molding every time the mold clamping force setting value is set and injection molding is performed based on the mold clamping force setting value.

Specifically, the evaluation acquiring part 1312 acquires evaluation information indicating the evaluation of the molding product that is molded every time the mold clamping force setting value is set and injection molding is performed based on the mold clamping force setting value. For example, the evaluation acquiring part 1312 acquires a value (hereinafter referred to as a measurement value) indicating a measurement result by a sensor provided in the injection molding machine 10 as the evaluation information. The evaluation of the molding product according to the present embodiment is based on whether or not a burr is created in the molding product. That is, the evaluation acquiring part 1312 according to the present embodiment acquires a measurement value as an index of whether or not a burr is created in the molding product.

The measurement value may be, for example, a difference in the mold clamping force (detected by the mold clamping force detector) generated in the molding cycle.

FIG. 5 is a diagram illustrating various parameters for each (shot) number used in the evaluation acquiring part 1312 and the ground truth information calculating part 1313 according to the present embodiment. In the example illustrated in FIG. 5, the mold clamping force setting value, the mold clamping force detection value, the measurement value, the mold clamping force recommended value, and the mold clamping force adjustment value are indicated in association with each (shot) number. The mold clamping force detection value is, for example, the highest value (peak value) among the detection values of the mold clamping force detected during the period from the start to the end of the molding cycle. In the example illustrated in FIG. 5, the mold clamping force setting value is different for each shot, and the molding conditions other than the mold clamping force setting value are fixed.

The evaluation acquiring part 1312 acquires the measurement value every time the mold clamping force setting value is set and injection molding is performed, that is, for every (shot) number. The measurement value according to the present embodiment is a difference in the mold clamping force. Specifically, the measurement value is a value obtained by subtracting the detection value of the mold clamping force detected at the start of filling from the detection value of the mold clamping force detected at the time before the mold unit 800 is opened.

In the present embodiment, the difference in the mold clamping force to be obtained (that is, the increased mold clamping force) is regarded as the amount by which the mold unit 800 is opened by the molding material entering the parting line surface. For this reason, the evaluation acquiring part 1312 calculates the difference in the mold clamping force and acquires the calculated difference in the mold clamping force as a measurement value corresponding to the burr created in the molding product.

In the present embodiment, the measurement value corresponding to the burr created in the molding product is not limited to a value obtained by subtracting the detection value of the mold clamping force from the detection value of the mold clamping force. For example, the measurement value may be a result of measuring the amount of burr with respect to the molding product taken out of the molding machine.

In the present embodiment, an example will be described in which the evaluation acquiring part 1312 acquires a measurement value (indicating the evaluation of the presence or absence of burr) every time the mold clamping force setting value is set and injection molding is performed, but the method is not limited to the method of acquiring a measurement value every time the mold clamping force setting value is set and injection molding is performed. For example, as illustrated in FIG. 5, the evaluation acquiring part 1312 may acquire a difference in the clamping force as a measurement value (indicating the evaluation of the presence or absence of burr) every time injection molding is performed and the mold clamping force detection value is detected.

The ground truth information calculating part 1313 calculates, as information indicating ground truth, a mold clamping force setting value that is estimated to cause no burr in the molding product based on a measurement value (an example of evaluation information) obtained for each mold clamping force setting value or each mold clamping force detection value.

Figure 6:
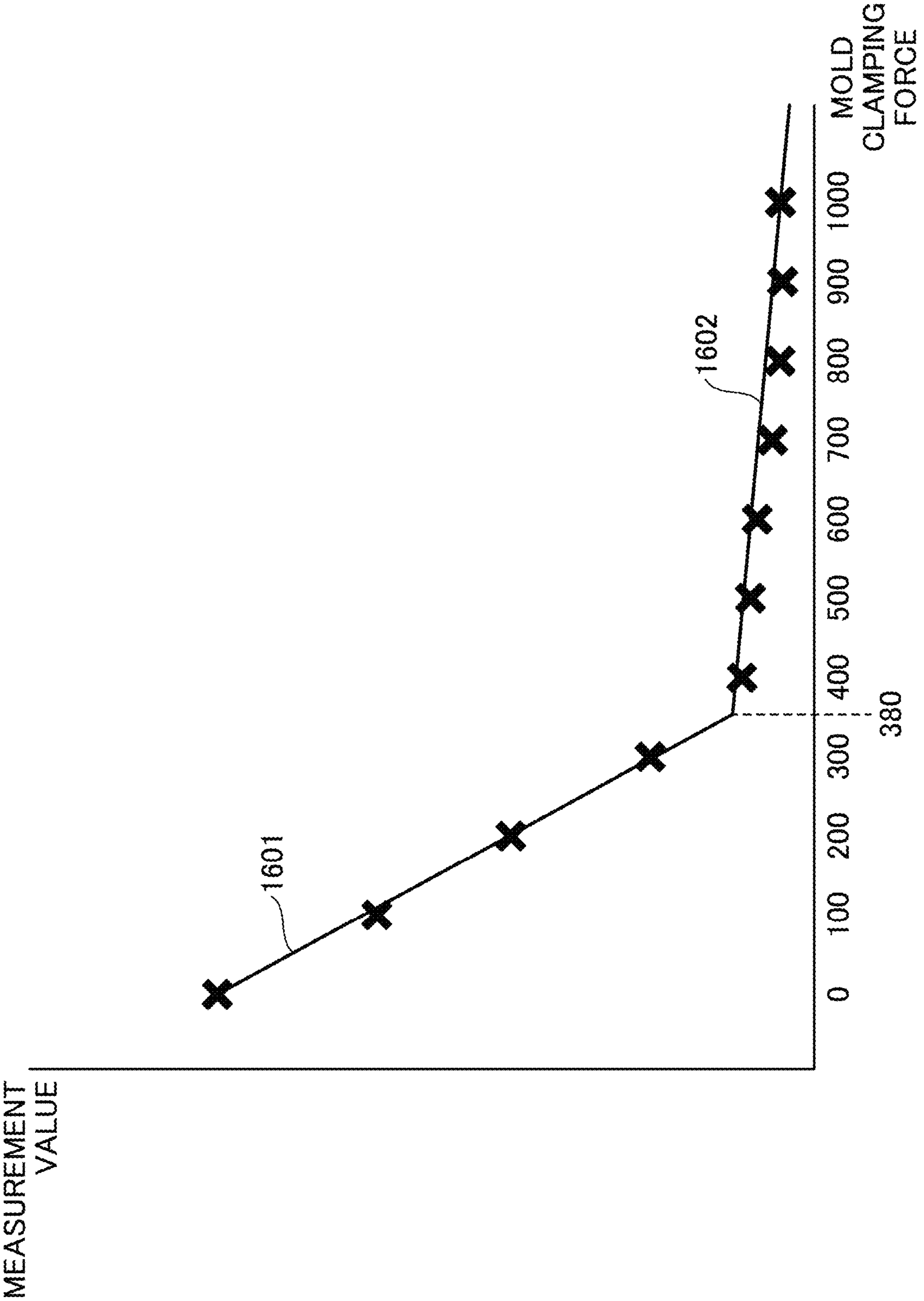
FIG. 6 illustrates an example of a method for calculating information related to the ground truth of the clamping force setting value by the ground truth information calculating part according to the first embodiment.

FIG. 6 is a diagram illustrating an example of a method of calculating information relating to ground truth of a mold clamping force setting value by the ground truth information calculating part 1313 according to the present embodiment. In the example illustrated in FIG. 6, the ground truth information calculating part 1313 approximates the measurement value for each mold clamping force by two straight lines, which are a line 1601 and a line 1602. As an approximation method of the two straight lines, for example, a least-squares method is used. Then, the ground truth information calculating part 1313 calculates the intersection of the two straight lines as the mold clamping force recommended value. In the example illustrated in FIG. 6, the ground truth information calculating part 1313 calculates the mold clamping force 380 [kN], which is the intersection of the lines 1601 and 1602, as the mold clamping force recommended value. FIG. 6 illustrates an example of the calculation method, and the calculation method is not limited to this calculation method. For example, the ground truth information calculating part 1313 may perform a curve approximation instead of the two-line approximation, and calculate the change point of the curve as the mold clamping force recommended value.

In the example illustrated in FIG. 5, the mold clamping force recommended value 380 [kN] and the mold clamping force adjustment value for adjusting the mold clamping force detection value are indicated for each number. The mold clamping force adjustment value illustrated in FIG. 5 is a value for adjusting the mold clamping force detection value, but may be a value for adjusting the current mold clamping force setting value. In the present embodiment, the mold clamping force adjustment value is used as information relating to the ground truth.

In the present embodiment, the ground truth information calculating part 1313 divides the range of the mold clamping force setting value that can be set by the injection molding machine 10 by a predetermined section (for example, 100 [kN]). Then, the ground truth information calculating part 1313 generates information relating to the ground truth indicating whether or not the mold clamping force adjustment value is included in each section, for each section obtained by dividing the range that can be set as the mold clamping force setting value.

FIG. 7 is a diagram illustrating information relating to the ground truth generated by the ground truth information calculating part 1313 according to the present embodiment. In the example illustrated in FIG. 7, it is indicated whether the mold clamping force adjustment value is included for each section "100" in the range from "−1000" to "1000" of the mold clamping force setting value that can be set by the injection molding machine 10. In the example illustrated in FIG. 7, "1" indicates that the mold clamping force adjustment value is included, and "0" indicates that the mold clamping force adjustment value is not included. In the example illustrated in FIG. 7, each section is a half-open section, "[" indicates a closed section, that is, greater than or equal to the specified value, and ")" indicates an open section, that is, less than the specified value.

As illustrated in FIG. 5, the (shot) number "1" has the mold clamping force setting value "1000", the mold clamping force adjustment value "990", the mold clamping force recommended value "380", and the mold clamping force adjustment value "−610".

Therefore, in the example illustrated in FIG. 7, in the (shot) number "1", the section [−700, −600) is "1", that is, it is indicated that the mold clamping force adjustment value is included in the section. The other sections are "0".

Then, the ground truth information calculating part 1313 generates a row vector indicating whether or not the mold clamping force adjustment value is included for each section as information related to the ground truth. The row vector corresponding to the (shot) number "1" is, for example, [0, 0, 0, 1, 0, 0, 0, 0, 0, 0, 0, 0, 0, 0, 0, 0, 0, 0, 0, 0]. The row vector is a matrix in which "1" or "0" is set for every 100 (half-open sections) in the range from "1000" to "−1000". "1" indicates that the mold clamping force adjustment value is included, and "0" indicates that the mold clamping force adjustment value is not included.

Also for the numbers "2" to "11", the ground truth information calculating part 1313 generates row vectors. The generation method is the same as the case of the number "1" described above, and the description thereof is omitted.

Referring back to FIG. 4, the training data generating part 1314 generates training data obtained by combining the waveform data for each (shot) number acquired by the acquiring part 1311 and the row vector for each (shot) number generated by the ground truth information calculating part 1313. Then, the training data generating part 1314 stores the generated training data in the training data storage part 1321.

The present embodiment exemplifies a method of generating training data, and training data may be generated by methods other than the method described above. Further, although in the present embodiment, a description is given of an example in which the ground truth information calculating unit 1313 automatically generates information about the ground truth based on the evaluation information, the present embodiment is not limited to the method of automatically generating information based on the evaluation information, and for example, the ground truth information calculating unit 1313 may generate information about the ground truth in accordance with information input from the user via an operation device. Further, after the ground truth information calculating unit 1313 calculates the information related to the ground truth, the user may visually confirm the information related to the ground truth, and a correction to the information may be received, or the like.

Further, the method is not limited to the method in which the learning device 1300 automatically performs all the steps up to the generation of the learned model LM. For example, after the learning device 1300 generates a plurality of training data items, the user may confirm the contents included in each of the plurality of training data items.

In the present embodiment, the plurality of training data items may be referred to as a training data set. The training data set is a set of training data items consisting of a combination of waveform data as an input and a row vector indicating whether or not a mold clamping force adjustment value is included in each section as an output.

Then, the learning device 1300 may generate a learned model LM based on the training data set after the user completes confirmation, correction, or the like of the contents included in the training data set.

(Generation of Learned Model, Etc.)

The learning part 1315 generates a learned model LM by performing machine learning based on the training data set stored in the training data storage part 1321. The learned model LM is generated by applying supervised learning to the base learning model.

Specifically, the learning part 1315 generates a learned model LM by performing machine learning based on waveform data indicating the result detected by the mold clamping force detector for each value set as the mold clamping force setting value or each value detected as the mold clamping force detection value included in the training data set, and row vectors indicating whether or not the mold clamping force adjustment value is included in each section obtained by dividing the range that can be set as the mold clamping force setting value.

When waveform data (example of second data) indicating the time series of the mold clamping force, detected while the injection molding machine 10 or the test injection molding machine 1350 is performing molding, is input from the input layer, the learned model LM outputs, from the output layer, a row vector indicating the confidence level indicating that the mold clamping force adjustment value is included in the section for each section obtained by dividing the range that can be set as the mold clamping force.

The learned model LM may be updated by additionally causing the existing learned model LM to learn a new training data set.

As the machine learning to be used for generating the learned model LM, for example, a neural network may be applied, or, as another example, machine learning using a deep neural network (DNN) and deep learning may be applied. As the deep learning, for example, a convolutional neural network, RNN (Recurrent Neural Networks), or LSTM (Long Short Term Memory) may be applied.

Figure 8:
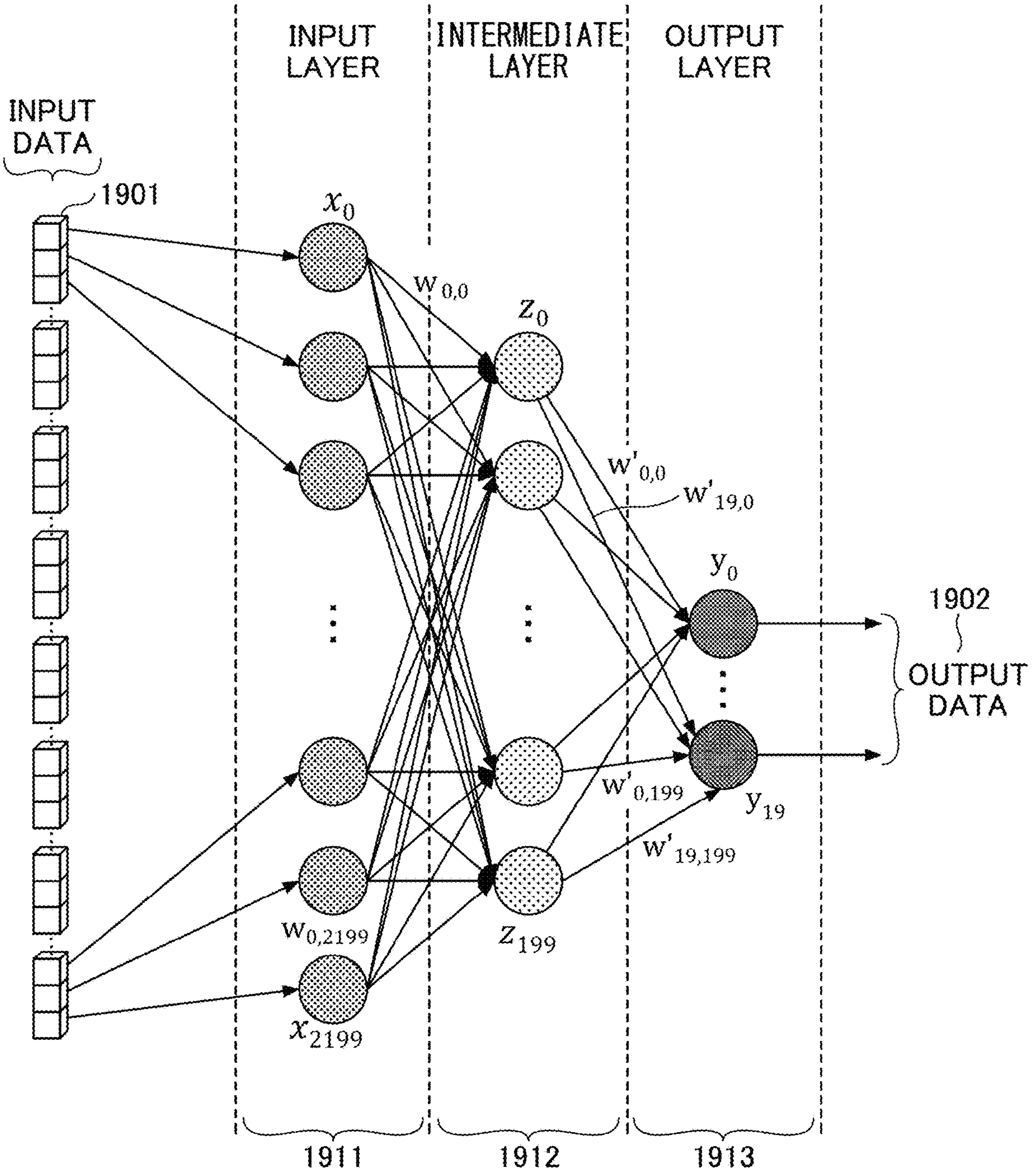
FIG. 8 illustrates the structure of the learned model used in the learning device and the control device according to the first embodiment.

FIG. 8 is a diagram illustrating the structure of the learned model LM used in the learning device 1300 and the control device 700 according to the first embodiment.

The learned model LM illustrated in FIG. 8 includes an input layer 1911, one or more intermediate layers 1912 connected to the input layer, and an output layer 1913 connected to the intermediate layer. The input layer has, for example, 2200 nodes, the intermediate layer has, for example, 200 nodes, and the output layer has 20 nodes.

When input data 1901 corresponding to 2200 nodes is input, the learned model LM outputs output data 1902 corresponding to 20 nodes.

The input data 1901 is, for example, waveform data indicating actual values that change during injection molding in chronological order. The input data 1901 may be, for example, waveform data indicating a change in mold clamping force as a result of detection by the mold clamping force detector in chronological order during injection molding.

The output data 1902 outputs, for example, a row vector for adjusting a predetermined item of the injection molding machine 10. The output data 1902 is, for example, a row vector for adjusting a mold clamping force setting value set during injection molding in the injection molding machine 10. Specifically, the output data 1902 is a row vector illustrating a confidence level for each section obtained by dividing a range that can be set as a mold clamping force setting value. The confidence level indicates the degree to which the mold clamping force adjustment value included in the section is correct (ground truth) as a value for adjusting the mold clamping force setting value. The confidence level in the present embodiment is a numerical value within the range of 0 to 1. A confidence level of "1" indicates that the probability of the mold clamping force adjustment value being included in the section is 100%, and a confidence level of "0" indicates that the probability of the mold clamping force adjustment value being included in the section is 0%.

As described above, when the waveform data of the mold clamping force detected by the mold clamping force detector is input, the learned model LM outputs a row vector indicating the confidence level for each section in a range that can be set as the mold clamping force setting value.

When the learning part 1315 learns by using the training data, the waveform data included in the training data may be preprocessed. Note that the preprocessing may also be performed when the inference part 715, which will be described later, makes an inference.

In the present embodiment, for example, the mold clamping force setting value or the mold clamping force detection value used in the waveform data and the like may be divided by a rated mold clamping force to perform preprocessing so that the mold clamping force setting value or the mold clamping force detection value and the like fall within the range of 1.0.

As a modified example different from the present embodiment, preprocessing such as label smoothing may be performed on the ground truth information calculated by the ground truth information calculating part 1313. The label smoothing is a method of distributing, to a false label, the probability value subtracted from the ground truth label, with respect to a hard ground truth label consisting only of "0" or "1", to mitigate the difference between the ground truth label and the false label. Therefore, in the modified example, the ground truth information is not represented by "0" or "1" but by a numerical value including a decimal between "0" and "1". When label smoothing is performed, for example, the row vector [0, 0, 0, 1, 0, 0, 0, 0, 0, 0, 0, 0, 0, 0, 0, 0, 0, 0, 0, 0] described above becomes the row vector [0.01, 0.01, 0.01, 0.81, 0.01, 0.01, 0.01, 0.01, 0.01, 0.01, 0.01, 0.01, 0.01, 0.01, 0.01, 0.01, 0.01, 0.01, 0.01, 0.01]. Other processes are omitted as they are the same as those of the embodiment. In this modified example, by applying the preprocessing, overfitting can be prevented and accuracy can be improved.

In the test injection molding machine 1350 according to the present embodiment, various mold units are attached and various molding conditions are set. In the learning device 1300, a training data set is generated based on various detection results obtained by producing molding products by the test injection molding machine 1350.

Thus, the learning device 1300 prepares a training data set based on various molding conditions provided in the test injection molding machine 1350 and various mold units provided in the test injection molding machine 1350. The learning device 1300 performs machine learning using the training data set to generate a learned model LM. Thus, inference using the learned model LM can be performed regardless of the molding conditions and the type of the mold unit 800.

Therefore, the control device 700 of the injection molding machine 10 can change the mold clamping force setting value by using the learned model LM regardless of the provided mold unit 800 and the set molding conditions.

In the example illustrated in FIG. 8, in the input layer, the variable corresponding to each node is defined as the input variable vector $x_{0\ to\ 2199}$. In the intermediate layer, the variable corresponding to each node is defined as the intermediate variable vector $z_{0\ to\ 199}$. In the output layer, the variable corresponding to the node is defined as the output variable vector $y_{0\ to\ 19}$.

In this case, the formula for calculating the intermediate variable vector $z_0$ of the intermediate layer is calculated by the following formula (1). In the formula (1), the weight vectors $w_{0\ to\ 199,\ 0\ to\ 2199}$ are weight vectors (of 200×2200 dimension) for outputting the values of the intermediate variable vector $z_{0\ to\ 199}$ from each node of the input layer. Note that the intermediate variable vector $z_{1\ to\ 199}$ can also be calculated by using the same formula, and the description thereof will be omitted. The bias $b_{0\ to\ 199}$ is omitted in FIG. 8, but is used in the neural network. As the activation function φ, for example, a ReLU function may be used, but other functions may be used.

$$z_0 = \varphi(w_{0,0\ to\ 2199} \cdot x_{0\ to\ 2199} + b_0) \tag{1}$$

The formula for calculating the output variable vector $y_0$ of the output layer is calculated by the following formula (2). In the formula (2), the weight vector $w'_{0\ to\ 199}$ is a weight vector for outputting a value from each node of the intermediate layer to the output variable y. Because the output variable vector $y_{1\ to\ 19}$ can also be calculated by using the same formula, a description thereof will be omitted. The bias b' is omitted in FIG. 8, but is used in the neural network. The activation function φ' may be, for example, a ReLU function, but other functions may be used.

$$y_0 = \varphi'\left(w'_{0,0\ to\ 199} \cdot z_{0\ to\ 199} + b'\right) \tag{2}$$

Further, when training or inference is performed with the learned model LM, the cross-entropy error used in the multi-level classification problem is used. Thus, each element of the row vector output from the learned model LM can be output with a numerical value (hereinafter referred to as a confidence level) between 0 to 1, instead of 0 or 1.

In the present embodiment, an example of outputting the output variable vector $y_{0\ to\ 19}$ including 20 elements will be described. The number of elements included in the row vector is not limited to 20, but is determined according to the number of sections dividing the range to be adjusted. The number of sections may be 2 or more.

In the present embodiment, an example of determining a settable range according to the rated mold clamping force that can be set by the injection molding machine 10 is described, but the method is not limited to determining the settable range based on the rating of the injection molding machine 10. In the settable range, a range limited by a predetermined method may be used.

The item to be set according to the present embodiment is not qualitative data (categorical data, nominal scale) but quantitative data (continuous scale). The quantitative data includes both a discrete value such as an integer and a continuous value such as a real number.

That is, in the present embodiment, although the setting value of the item to be set can be calculated even when a regression model is used, it cannot be recognized how confident the learned model is about the setting value calculated when the regression model is used. Therefore, it is difficult for the user to infer whether there is no problem in setting of the setting value.

On the other hand, because the learned model LM according to the present embodiment outputs the confidence level for each section, the control device 700 or the user can infer whether or not the adjustment value is appropriate for each section.

The learning part 1315 stores the generated learned model LM in the learned model storage part 1322.

Referring back to FIG. 4, the communication control part 1316 uses the communication I/F 1303 to exchange information with an external device such as the injection molding machine 10. For example, the communication control part 1316 may transmit the learned model LM stored in the learned model storage part 1322 to the control device 700 of the injection molding machine 10. The communication control part 1316 may also extract a structure indicating parameters (e.g., weight and bias) set in each layer constituting the learned model LM stored in the learned model storage part 1322, and transmit the structure to the control device 700.

FIG. 4 illustrates the elements of the control device 700 of the injection molding machine 10 as functional blocks. The functional blocks illustrated in FIG. 4 are conceptual, and need not necessarily be physically configured as illustrated. All or a part of the functional blocks can be functionally or physically distributed and integrated in arbitrary units. All or an arbitrary part of each processing function performed in each functional block is implemented by a program executed by the CPU 701. Alternatively, each functional block may be implemented as hardware by wired logic. As illustrated in FIG. 4, the CPU701 of the control device 700 includes a communication control part 711, an update part 712, an injection molding processing part 713, a setting part 714, and a display control part 716. The control device 700 also includes a learned model storage part 721 in the storage medium 702.

The learned model storage part 721 stores the learned model LM. The configuration of the learned model LM for each layer is the same as the learned model LM stored in the learned model storage part 1322 of the learning device 1300.

The communication control part 711 uses the communication I/F 705 to transmit and receive information with an external device such as the learning device 1300. For example, the communication control part 711 may receive the learned model LM from the learning device 1300. The communication control part 711 may also receive information indicating a structure indicating a parameter (e.g., weight and bias) set in each layer constituting the learned model LM.

In the present embodiment, as a method of acquiring the learned model LM or information indicating a structure, an example of receiving these from the learning device 1300 has been described; however, this does not limit the method of acquiring the learned model LM or information indicating a structure. For example, the learned model LM or information indicating a structure may be acquired via an external storage medium.

The update part 712 updates the learned model LM stored in the learned model storage part 721 with the received learned model LM or information indicating a structure. Thus, the update part 712 can match the learned model LM stored in the learned model storage part 721 with the learned model LM of the learning device 1300.

When updating the learned model LM with information indicating a structure indicating a parameter (e.g., weight and bias) set for each layer constituting the learned model LM, the update part 712 may be configured as a program for updating the learned model LM. The update part 712 may determine whether or not the defined number of layers and number of nodes per layer match the learned model LM stored in the learned model storage part 721 and the received information indicating the structure. Then, the update part 712 updates the learned model LM when it is determined that these numbers match. When it is determined that these numbers do not coincide, the update part 712 may not update the learned model LM and output an alert screen indicating that the structure is different to the display device 760 or the like.

The injection molding processing part 713 executes processing for producing a molding product by the injection molding machine 10. For example, when producing a molding product, the injection molding processing part 713 may perform injection molding after setting each item constituting the molding conditions.

The setting part 714 includes an inference part 715 and sets a mold clamping force setting value based on information acquired from the inference part 715.

For example, the inference part 715 inputs, to the input layer of the learned model LM, waveform data (an example of second data) indicating the result detected by the mold clamping force detector during the production of the molding product by the injection molding processing part 713, and receives, from the output layer of the learned model LM, a row vector indicating the confidence level for each section obtained by dividing the range that can be set as the mold clamping force setting value.

The inference part 715 may perform preprocessing on the waveform data before inputting the waveform data to the input layer.

Then, the setting part 714 sets the mold clamping force setting value based on the row vector received from the inference part 715.

FIG. 9 is a diagram illustrating information based on the row vector output from the inference part 715 according to the present embodiment. In the example illustrated in FIG. 9, the section label, the center value of the section, the confidence level, and the cumulative sum of the confidence levels are indicated in association with each "100" (which is a half-open section) in the range from "1000" to "−1000".

The confidence level can be interpreted as the probability that the mold clamping force adjustment value is included in the section. In the example illustrated in FIG. 9, it can be interpreted that the probability that the mold clamping force adjustment value is included in the half-open section [−200, −100) having the confidence level "0.21" is the largest.

Then, the setting part 714 calculates the mold clamping force adjustment value from the row vector output from the inference part 715, and sets the mold clamping force setting value based on the calculated mold clamping force adjustment value.

For example, the setting part 714 identifies the section label "[−200, −100)" having the highest confidence level based on the confidence level for each section. When the center value is used, the setting part 714 sets "−150" as the mold clamping force adjustment value, and sets the mold clamping force setting value by using the mold clamping force adjustment value and the current mold clamping force setting value or the detected mold clamping force detection value. Note that the present embodiment is not limited to the method of determining the center value as the mold clamping force adjustment value, and for example, the setting part 714 may determine the upper limit or lower limit of the section as the mold clamping force adjustment value. Similarly, the subsequent mold clamping force adjustment values are not limited to the center value.

Further, the present embodiment is not limited to the method of determining the mold clamping force adjustment value based on the section with the highest confidence level, and may be determined based on the cumulative sum of confidence levels.

For example, the threshold value of the cumulative sum of confidence levels may be determined as 0.7. In this case, the setting part 714 identifies the section label "[−100, 0)" for which the cumulative sum of the confidence values for each section is greater than or equal to 0.7. When the center value is used, the setting part 714 sets "−50" as the mold clamping force adjustment value and sets the mold clamping force setting value by using the mold clamping force adjustment value and the current mold clamping force setting value or the detected mold clamping force detection value. Thus, by increasing the threshold value of the cumulative sum, the mold clamping force setting value is increased. As increasing the mold clamping force setting value tends towards the safe side regarding the creation of burrs, the creation of burrs can be prevented.

In the present embodiment, the threshold value of the cumulative sum may be adjustable. The user or the maintenance person can adjust the certainty of the mold clamping force adjustment value according to the situation of the injection molding machine 10 (including the mold unit 800). Therefore, by the user or the maintenance person adjusting the threshold value of the cumulative sum, the occurrence of an overload on the mold unit 800 due to the inference error of the mold clamping force adjustment value can be prevented. Alternatively, the creation of burrs can be prevented.

In the present embodiment, when the setting part 714 determines the mold clamping force adjustment value based on the cumulative sum of the confidence levels, instead of the center value of the interval, the mold clamping force adjustment value for which the cumulative sum of the confidence levels is exactly the threshold value may be obtained by linear interpolation.

In the case of linear interpolation of the mold clamping force adjustment value for which the threshold value is exactly 50% in the row data illustrated in FIG. 9, the setting part 714 calculates this from the following formula (3).

$$-250+\{(0.50-0.48)/(0.69-0.48)\}\times\{-150-(-250)\}=-240.48\ [\text{kN}] \quad (3)$$

The setting part 714 determines the mold clamping force adjustment value by the above-described method but is not limited to setting the mold clamping force setting value based on the mold clamping force adjustment value. For example, information output from the learned model LM may be displayed to the user and the mold clamping force adjustment value may be determined based on an operation from the user who has visually recognized the information.

The display control unit 716 displays the information on the display device 760. For example, the display control unit 716 may display image information indicating the confidence level (an example of the degree of ground truth) for each section.

Figure 10:
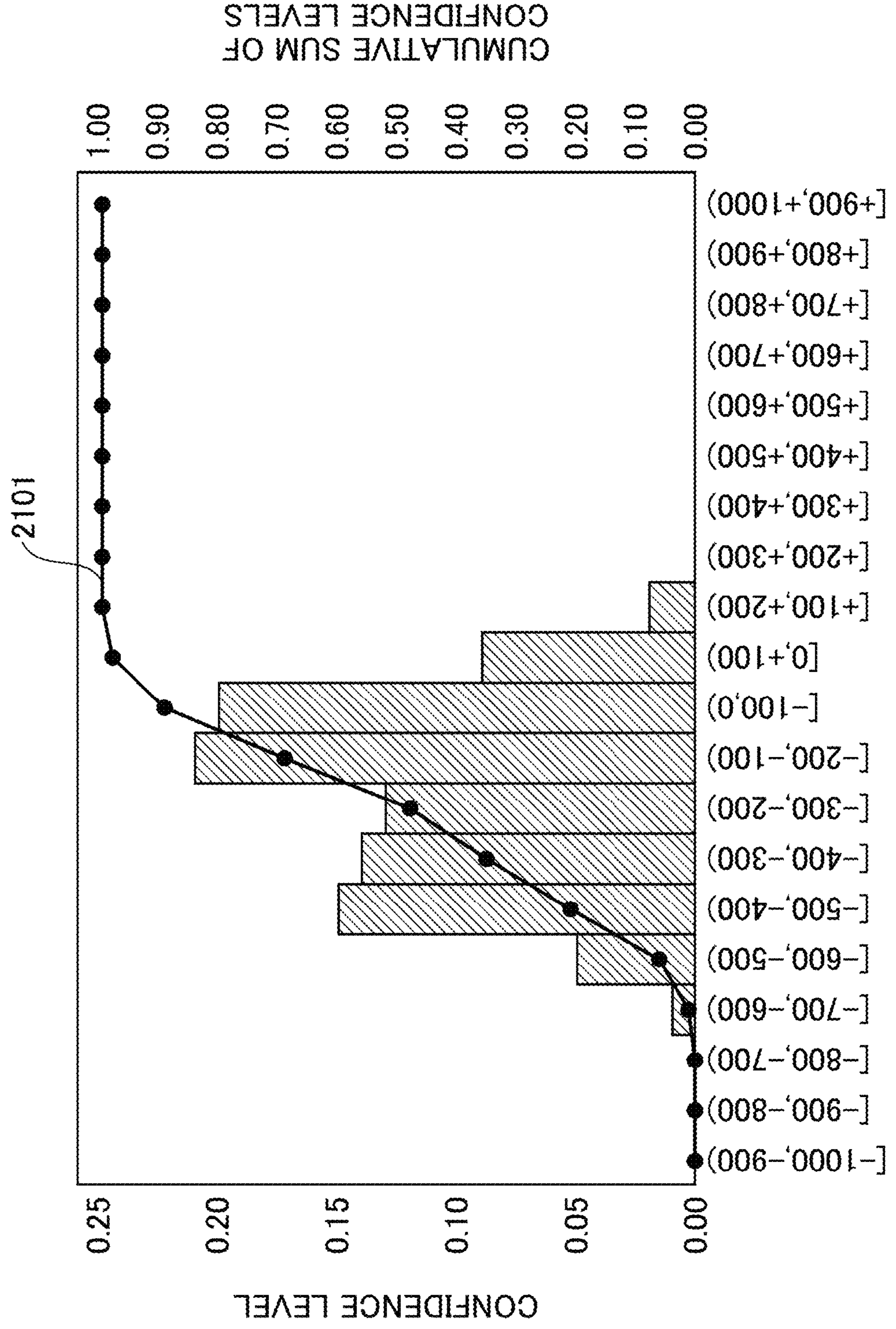
FIG. 10 illustrates a first example of a graph indicating the confidence level for each section output from the inference part according to the first embodiment.

FIG. 10 is a diagram illustrating a first example of a graph indicating the confidence level for each section, output from the inference part 715 according to the present embodiment. The display control unit 716 according to the present embodiment may display image information including the graph illustrated in FIG. 10 on the display device 760. The user can recognize the probability (confidence level) that the section can be used as the mold clamping force adjustment value for each section by referring to the graph illustrated in FIG. 10. Then, the user can adjust the mold clamping force adjustment value based on the confidence level.

For example, the user may input the mold clamping force adjustment value through the operation device 750 by referring to the image information. Further, the user may set the threshold value of the cumulative sum of the confidence levels by referring to the image information. Further, the user may select a method for setting the mold clamping force adjustment value by referring to the image information. For example, the user may make a selection as to whether to set the mold clamping force adjustment value of the section having the highest confidence level, or to set the mold clamping force adjustment value of the section having the cumulative sum of confidence levels greater than or equal to a predetermined threshold value.

The setting part 714 according to the present embodiment may switch whether to set the mold clamping force setting value (an example of a predetermined item) based on the confidence level of each section. Specifically, the setting part 714 may switch the method of setting the mold clamping force setting value according to the kurtosis representing the confidence level of each section. The kurtosis is an index indicating the sharpness of the distribution of confidence levels of each section included in the row vector. The method of calculating the kurtosis may be any method including known methods.

Figure 11:
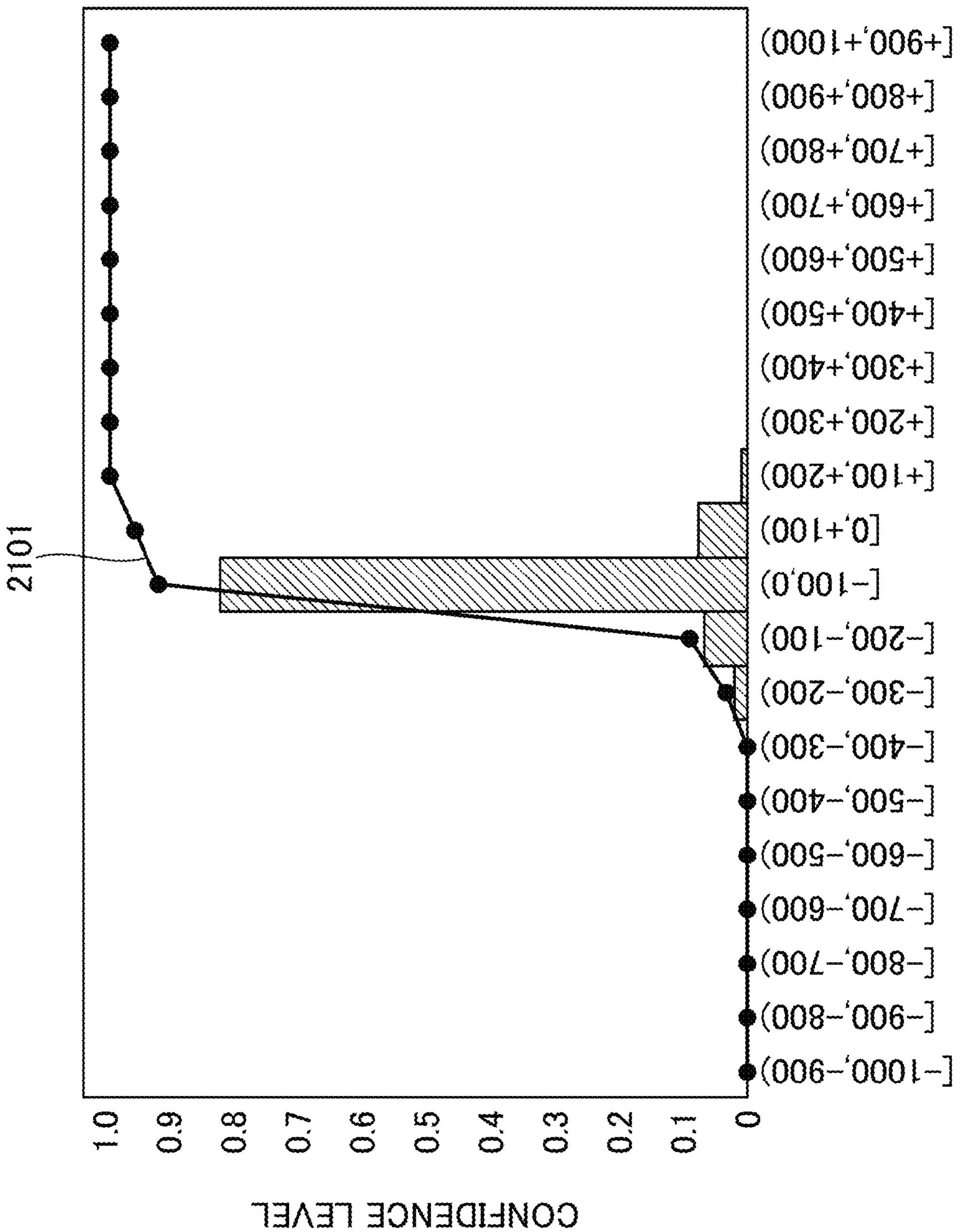
FIG. 11 illustrates a second example of a graph indicating the confidence level for each section output from the inference part according to the first embodiment.

FIG. 11 is a diagram illustrating a second example of a graph indicating the confidence level of each section output from the inference part 715 according to the present embodiment. In the example illustrated in FIG. 11, the confidence level of each section and the cumulative value 2101 of the confidence levels are illustrated. In the example illustrated in FIG. 11, compared with the example illustrated in FIG. 10, it can be understood that the confidence level is not dispersed in a plurality of sections and the kurtosis is higher.

In the example illustrated in FIG. 11, the confidence level is 0.8 or higher in the half-open section "[−100, 0)". That is, in the example illustrated in FIG. 11, the probability that the mold clamping force adjustment value is included in "[−100, 0)" is very high.

Therefore, when the kurtosis is higher than the first reference, the setting part 714 may identify a section label having the highest confidence level, determine the mold clamping force adjustment value based on the section label, and set the mold clamping force setting value based on the mold clamping force adjustment value and the current mold clamping force setting value or the detected mold clamping force detection value. Instead of using the kurtosis as the determination reference, the determination may be performed based on whether the highest confidence level is greater than or equal to a predetermined value. The same applies to the following.

When the kurtosis is lower than the first reference and the kurtosis is higher than the second reference, the setting part 714 may identify a section label having a cumulative sum of the confidence levels for each section greater than or equal to a predetermined value, determine the mold clamping force adjustment value based on the section label, and set the mold clamping force setting value based on the mold clamping force adjustment value and the current mold clamping force setting value or the detected mold clamping force detection value.

Further, when the kurtosis is lower than the second reference, the setting part 714 may determine that the mold clamping force adjustment value should not be determined based on the row vector because the values are too distributed, and may terminate the process of setting the mold clamping force adjustment value.

In the present embodiment, the case of inputting waveform data to the learned model LM has been described. However, the present embodiment is not limited to the case of inputting waveform data to the learned model LM, and aggregate data indicating the result of measuring the molding product may be input after the molding product is injection molded. The aggregate data may include, for example, the measurement result of the amount of burrs at a plurality of predetermined positions with respect to the molding product after injection molding.

In the present embodiment, the mold clamping force adjustment value is determined in consideration of the confidence level for each section, and the mold clamping force setting value can be set using the mold clamping force adjustment value. In the present embodiment, the quality accuracy of the molding product produced after the setting can be improved in the injection molding machine 10. Because the mold clamping force setting value can be automatically set, the operation load of the user and the processing load of the control device 700 can be reduced.

In the present embodiment, an example of setting a mold clamping force setting value has been described. However, in the present embodiment, the setting target is not limited to the mold clamping force setting value. The setting target may be a setting for performing injection molding, and in particular, may be any quantitative data that needs to be adjusted in accordance with the conditions and environment for performing injection molding. The setting target may be a value detected by a sensor provided in the injection molding machine 10, or may be a time required for a predetermined process of the injection molding machine 10. The setting target may be applied to, for example, a hold pressure time, a VP switching position, a hold pressure setting, a filling speed setting, a filling pressure, and a back pressure setting. Further, as the setting information related to metering, the setting information may be applied to a metering rotation speed, a metering delay, and a metering completion position. Further, as the setting information related to mold clamping, the setting information may be applied to a pressure boosting timing, a mold opening/closing speed, and a mold opening position in addition to the mold clamping force setting value. Further, as the setting information relating to the ejector device 200, the ejector ejection position, the ejector ejection pressure, the ejector speed, and the ejector compression timing may be applied. Further, as the setting relating to the temperature in the injection molding machine 10, the cylinder temperature setting, the nozzle temperature setting, the water cooling temperature, and the mold temperature may be applied. Further, the setting target may be applied to the dimensions of the mold unit 800, the characteristics of the molding material, and the like.

In the present embodiment, the data obtained from the sensor or an external measuring instrument (including an imaging device) of the injection molding machine 10 is subjected to preprocessing, and then input to the learned model LM to realize the setting of predetermined items in an end-to-end manner. Therefore, the processing can be simplified as compared with the conventional technology. In the above-described embodiment, the processing load can be reduced as compared with the conventional technology, and because it is not necessary to use a high-performance CPU or the like, the cost can be reduced.

Further, in the above-described embodiment and the modified example, when the adjustment value is determined based on the cumulative sum of the confidence levels, the adjustment value can be changed only by adjusting the threshold value, even though the learned model LM is used. Therefore, the setting can be easily changed according to the situation of the injection molding machine 10 (including the mold unit 800).

(Modified Example)

In the above-described embodiment, an example has been described in which the learned model LM outputs a row vector indicating the confidence level for each section obtained by dividing the settable range of the item to be set. However, the above-described embodiment does not limit the information output by the learned model LM to the information related to the item to be a setting target. For example, the learned model LM may output a row vector indicating the confidence level that the evaluation is included in a section, for each section obtained by dividing the range of evaluation of the molding product. In the present modified example, the case of estimating the weight of the molding product as the evaluation of the molding product will be described.

Figure 12:
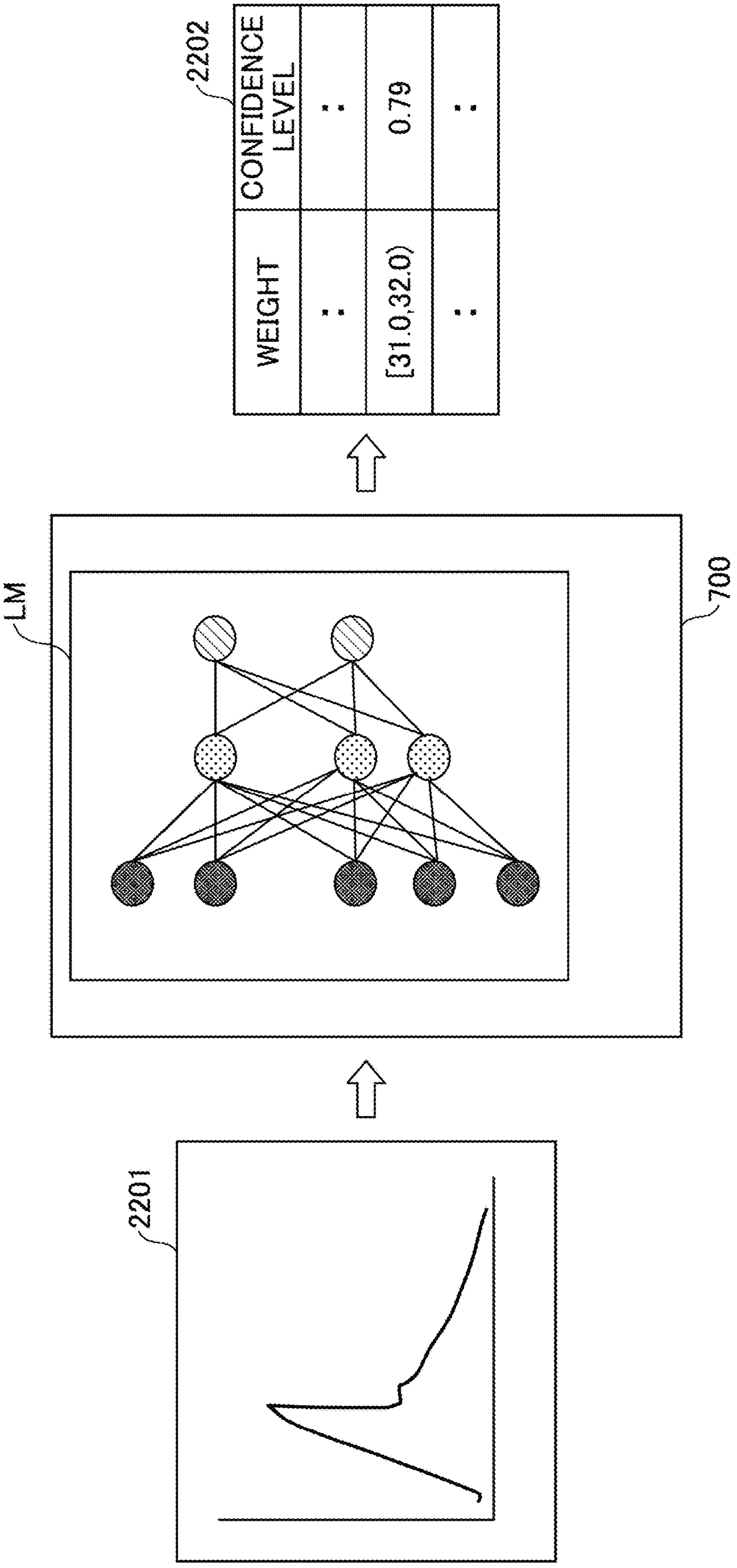
FIG. 12 is a conceptual diagram illustrating inference performed by the learned model mounted on the control device according to the modified example.

FIG. 12 is a conceptual diagram illustrating the inference performed by the learned model LM mounted on the control device 700 according to the present modified example.

The learned model LM according to the present modified example is generated by machine learning based on waveform data included in the training data set, the waveform data indicating the result detected by the mold clamping force detector, and row vectors indicating whether or not the weight of the molding product produced when the waveform data is detected is included for each section obtained by dividing the range detectable as the weight of the injection molding machine 10.

When the waveform data 2201 is input, the learned model LM of the control device 700 outputs a row vector 2202 indicating the confidence level in each section obtained by dividing the weight of the molding product by 1 g.

The waveform data 2201 may be, for example, data indicating a time series of one or more of the position of the screw 330, the hold pressure detection value, and the mold clamping force detection value.

In the row vector 2202 illustrated in FIG. 12, the confidence level is 0.79 in the half-open section [31.0, 32.0), which is the highest value. Therefore, the control device 700 may identify the weight of the molding product based on the half-open section [31.0, 32.0). For example, the control device 700 may identify the center value 31.5 in the half-open section [31.0, 32.0) as the weight of the molding product.

In the embodiment described above, in the row vector output from the learned model LM, the element constituting the row vector is the (0 to 1) confidence level for each section. However, in the present embodiment, the element constituting the row vector output from the learned model LM is not limited to the (0 to 1) confidence level for each section, but may be information indicating whether the section is correct (ground truth).

In this modified example, the evaluation of the molding product is not limited to the weight. For example, the dimensions of the molding product may be used, and quantitative data relating to the quality characteristics of the molding product may be used.

Second Embodiment

In the foregoing embodiment, an example has been described in which the control device 700 of the injection molding machine 10 makes settings by using the learned model as the management apparatus of the injection molding machine 10. However, the foregoing embodiment is not limited to a method in which the control device 700 of the injection molding machine 10 makes settings by using the learned model. Therefore, in the second embodiment, an example will be described in which a group management apparatus 2300 that controls the injection molding machine 10 makes settings by using the learned model LM.

Figure 13:
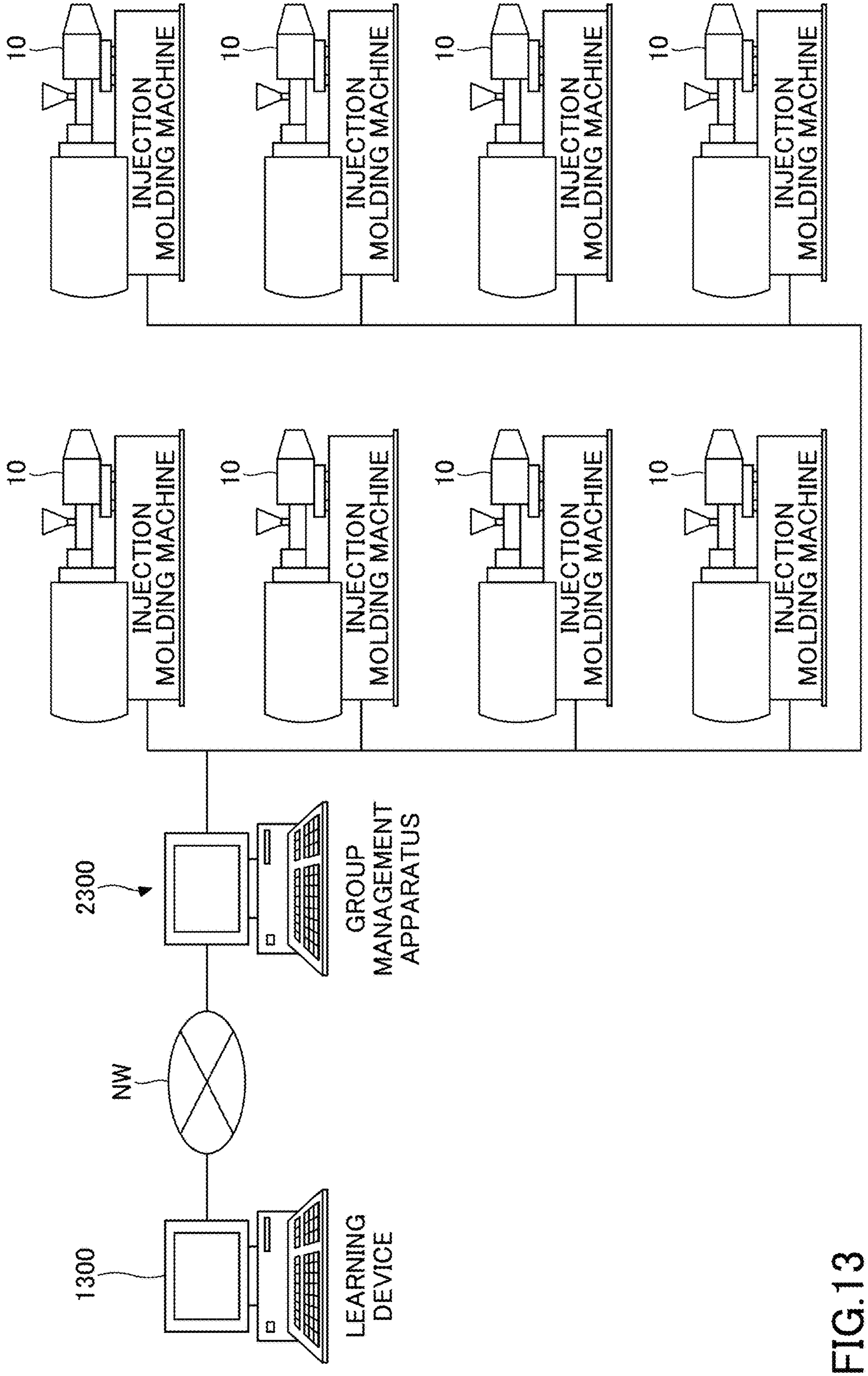
FIG. 13 is a diagram illustrating the configuration of a learning device, a group management apparatus, and an injection molding machine according to a second embodiment.

FIG. 13 is a diagram illustrating the configuration of the learning device 1300, the group management apparatus 2300, and the injection molding machine 10 according to the present embodiment. As illustrated in FIG. 13, the group management apparatus 2300 manages, for example, 8 injection molding machines 10. The number of injection molding machines to be managed is an example and may be any number.

In the present embodiment, the setting using the learned model LM by the control device 700 illustrated in the above-described embodiment is applied to the group management apparatus 2300 having a group management function with respect to a plurality of injection molding machines 10.

The learning device 1300 according to the present embodiment has the same configuration as that of the first embodiment. The learning device 1300 transmits information relating to the learned model LM to the group management apparatus 2300 via the communication line NW.

The communication line NW is, for example, an Internet communication line. When the learning device 1300 and the group management apparatus 2300 communicate with each other, it is preferable that these are connected by a VPN (Virtual Private Network). By connecting by a VPN, the safety of communication can be improved.

The group management apparatus (an example of a management apparatus) 2300 is an apparatus for managing a plurality of injection molding machines 10 from the viewpoint of productivity, and is connected to each injection molding machine 10, receives molding conditions and detection results obtained from various sensors, and assists in the management and planning of production situations, similarly to the control device 700 described above.

The group management apparatus 2300 may be implemented by a personal computer, for example. However, the group management apparatus 2300 does not normally have a function of controlling injection molding operations for each injection molding machine 10, but can have a control function if the function of a personal computer is extended.

Similar to the control device 700, the group management apparatus 2300 has a storage device (not illustrated) in which a learned model LM is stored.

Similar to the control device 700, the group management apparatus 2300 has a CPU (not illustrated), and the setting part 714 including the communication control part 711, the update part 712, the injection molding processing part 713, and the inference part 715, and the display control part 716 are implemented by causing the CPU to execute a program stored in a storage device, similar to the control device 700. The processing executed by each configuration is the same as the above-described embodiment, and is thus omitted from description.

The group management apparatus 2300 can be connected to the learning device 1300 via the communication line NW.

The group management apparatus 2300 receives information on the learned model LM from the learning device 1300. The group management apparatus 2300 updates the learned model LM based on the received information.

For example, the group management apparatus 2300 may calculate an adjustment value for a predetermined item based on waveform data indicated by the received detection result and transmit a request to set the adjustment value for each injection molding machine 10 as an aid to the management and planning of the production situation. Further, in the group management apparatus 2300, the display control unit 716 may display image information indicating the confidence level for each section. The user may make a setting for each injection molding machine 10 by referring to the displayed image information.

<Function>

In the above-described embodiment and the modified example, when waveform data is input to the input layer of the learned model LM, a column vector representing the confidence level that the value included in the section is correct (ground truth) for each section, is output from the output layer. Therefore, by referring to the confidence level, it is possible to recognize the extent to which the value included in the section is reliable. For example, the control device 700 or the user can identify whether or not to make a setting based on the value included in the section by referring to the confidence level. Therefore, safety can be improved when setting, processing, numerical calculating, or the like based on the value is performed.

In the embodiment and the modified example described above, the quantitative data is divided into sections and the confidence level in the sections is output. Therefore, the classification problem handled for outputting the confidence level in the learned model can be returned to the quantitative data again. Therefore, the quantitative data can be used for evaluation of molding products, setting, control, or numerical calculation related to injection molding.

Although embodiments of the learned model and the management apparatus of the injection molding machine according to the present invention have been described above, the present invention is not limited to the above embodiments. Various changes, modified examples, substitutions, additions, deletions, and combinations are possible within the scope of the claims. These also naturally fall within the technical scope of the present invention.

What is claimed is:

1. A learned model comprising:

an input layer;

one or two or more intermediate layers connected to the input layer; and an output layer connected to the intermediate layer, wherein the learned model causes a computer to function to perform machine learning based on first data indicating a result detected while a product is being produced by an injection molding machine or a result of measuring the product after the product is produced, and ground truth information indicating whether a value included in a section is ground truth for each section, each section being obtained by dividing an amount relating to production of the product into two or more sections, and output, from the output layer, a degree to which the value included in the section is the ground truth for each section, when second data is input from the input layer, the second data indicating the result detected while the product is being produced or the result of measuring the product after the product is produced.

2. The learned model according to claim 1, wherein the ground truth information indicates whether the value included in the section is the ground truth as a value to be set as a predetermined item for each section, the section being obtained by classifying a range that can be set as the predetermined item into two or more sections, and the output layer outputs a confidence level indicating a degree to which the value included in the section is the ground truth as the value to be set as the predetermined item, for each section.

3. The learned model according to claim 1, wherein the ground truth information indicates whether the value included in the section is the ground truth as an evaluation of the product for each section, the section being obtained by classifying a range that can be set as the evaluation of the product into two or more sections, and the output layer outputs a confidence level indicating a degree to which the value included in the section is the ground truth as the evaluation of the product, for each section.

4. A management apparatus for an injection molding machine, the management apparatus comprising:

a learned model including:

an input layer;

one or two or more intermediate layers connected to the input layer; and an output layer connected to the intermediate layer, wherein the learned model has performed machine learning based on first data and ground truth information, the first data indicating a result detected while a molding product is being produced by the injection molding machine or a result of measuring the molding product after the molding product is produced, and the ground truth information indicating whether a value included in a section is ground truth for each section, each section being obtained by dividing an amount relating to production of the product into two or more sections, the management apparatus further comprising:

an inference part configured to acquire, from the output layer, a degree to which the value included in the section is the ground truth for each section, when second data is input from the input layer, the second data indicating the result detected while the product is being produced or the result of measuring the product after the product is produced.

5. The management apparatus for the injection molding machine according to claim 4, further comprising:

a display control part configured to display image information displaying the degree to which the value included in the section is the ground truth for each section.

6. The management apparatus for the injection molding machine according to claim 4, wherein the ground truth information indicates whether the value included in the section is the ground truth as a value to be set as a predetermined item for each section, the section being obtained by classifying a range that can be set as the predetermined item into two or more sections, and the management apparatus further comprises:

a setting part configured to make a setting with respect to the predetermined item, based on a confidence level output from the output layer, the confidence level indicating a degree to which the value included in the section is the ground truth as the value to be set as the predetermined item, for each section.

7. The management apparatus for the injection molding machine according to claim 6, wherein the setting part sets, in the predetermined item, the value included in the section, based on a cumulative sum of the confidence levels of each of the sections.

8. The management apparatus for the injection molding machine according to claim 6, wherein the setting part switches whether to make the setting with respect to the predetermined item based on the confidence level of each section.

* * * * *